United States Patent
Brooker et al.

(10) Patent No.: US 11,392,497 B1
(45) Date of Patent: Jul. 19, 2022

(54) LOW LATENCY ACCESS TO DATA SETS USING SHARED DATA SET PORTIONS

(71) Applicant: Amazon Technologies, Inc., Seattle, WA (US)

(72) Inventors: Marc Brooker, Seattle, WA (US); Rory Jacob, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 17/105,250

(22) Filed: Nov. 25, 2020

(51) Int. Cl.
*G06F 12/08* (2016.01)
*G06F 12/0802* (2016.01)
*G06F 12/02* (2006.01)
*G06F 9/455* (2018.01)

(52) U.S. Cl.
CPC ...... *G06F 12/0802* (2013.01); *G06F 9/45558* (2013.01); *G06F 12/0253* (2013.01); *G06F 2212/60* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 2010/0146004 A1* | 6/2010 | Sim-Tang | G06F 11/1448 707/E17.012 |
| 2013/0205114 A1* | 8/2013 | Badam | G06F 9/52 711/207 |
| 2017/0091235 A1* | 3/2017 | Yammine | G06F 16/164 |
| 2017/0091296 A1* | 3/2017 | Beard | G06F 16/1865 |
| 2017/0286143 A1* | 10/2017 | Wagner | G06F 12/0875 |
| 2018/0203717 A1* | 7/2018 | Wagner | G06F 9/45558 |
| 2019/0018715 A1* | 1/2019 | Behrendt | G06F 9/542 |
| 2020/0026527 A1* | 1/2020 | Xue | H04L 67/02 |

* cited by examiner

*Primary Examiner* — Tracy C Chan
(74) *Attorney, Agent, or Firm* — Knobbe, Martens, Olson & Bear, LLP

(57) ABSTRACT

Systems and methods are described for providing rapid access to data sets used by serverless function executions. Rather than pre-loading an entire data set into an environment of a serverless function, which might incur large latencies, the environment is provided with a local access view of the data set, such as in the form of a read-only mount point. As blocks within the data set are requested, a local process can translate the requests into requests for corresponding network objects. The network objects are then retrieved, and the relevant portion of the object is made available to the environment. Network objects may be shared among multiple data sets, so a host device may include a cache enabling an object retrieved for a first environment to also be used to service requests from a second environment.

20 Claims, 9 Drawing Sheets

US 11,392,497 B1

LOW LATENCY ACCESS TO DATA SETS USING SHARED DATA SET PORTIONS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

Virtual machines are typically defined at least partly based on the data used to run the virtual machine, which is often packaged into a disk image. Generally described, a disk image is data set, such as a file, that contains the contents and structure of a disk volume or data storage device. For example, a disk image may contain an operating system, libraries, utilities, applications, configurations, and the like. By generating a virtual machine and provisioning it with a disk that matches the contents of the disk image, a user may configure the virtual machine to implement desired functionality. Disk images are also utilized in other virtualization techniques, such as operating-system-level virtualization, a technique in which the kernel of an operating system enables multiple isolated user space instances (often called "containers") without requiring virtualization of the kernel.

DETAILED DESCRIPTION

Figure 1:
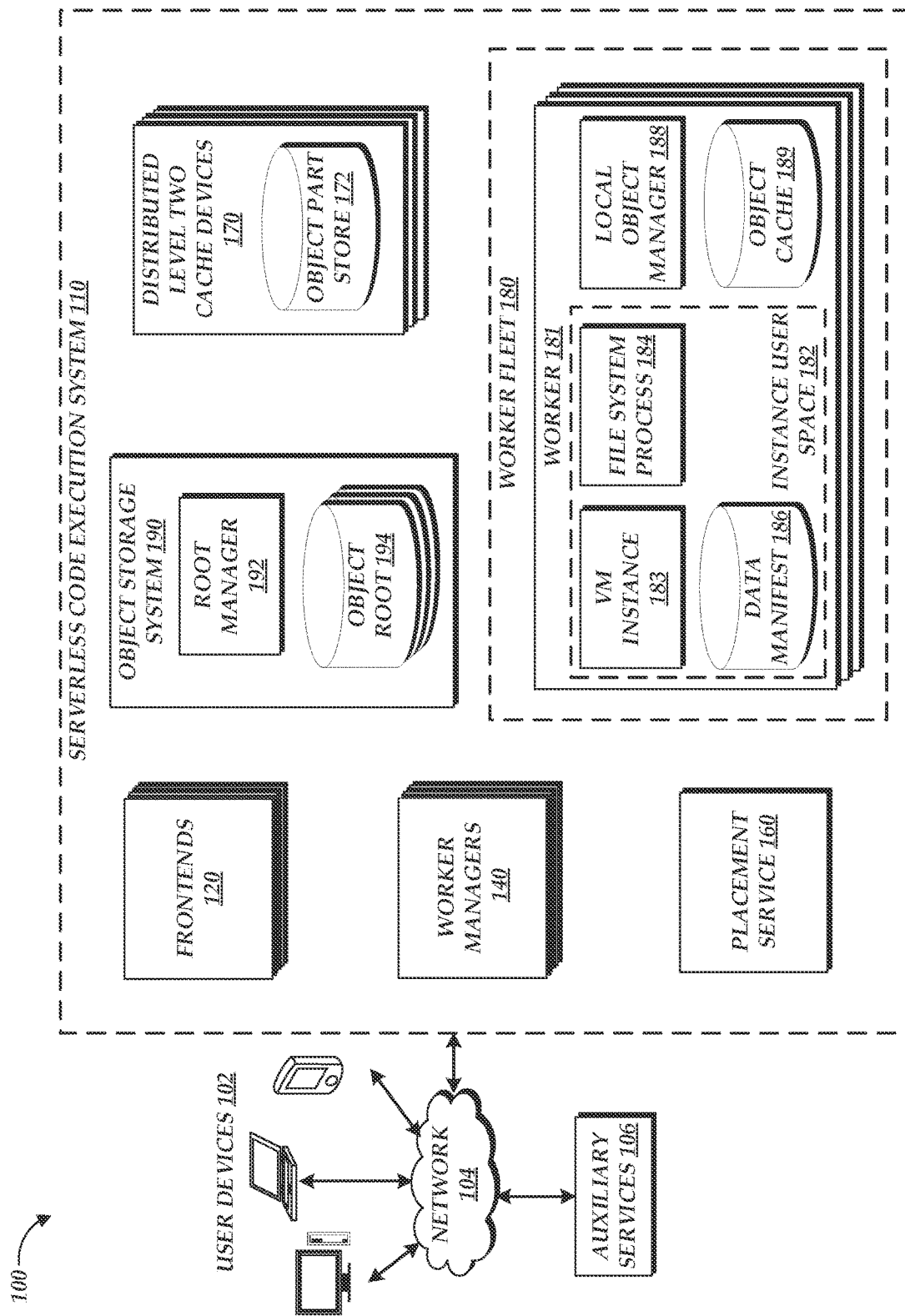
FIG. 1 is a block diagram depicting an illustrative environment in which a serverless code execution system can enable low latency execution of code by providing rapid access to data sets.

Generally described, aspects of the present disclosure relate to facilitating execution of code on a serverless code execution system, which may also be referred to as an on-demand code execution system. As described herein, a serverless code execution system enables rapid execution of source code, which may be supplied by users of the on-demand code execution system. For example, a user may submit a script in a specific programming language (e.g., the PYTHONT™ language) that, when executed, implements network-based processing for a user-facing application (e.g., a mobile device "app"). The serverless code execution system can then enable the user to submit "calls" to execute that script, at which point the system will securely execute the script to provide the desired functionality. Unlike some other network-based services, a serverless code execution system can remove the need for a user to maintain or configure a computing device, either virtual or physical, to support code execution. It is this lack of need for a user to maintain a device that leads to the "serverless" moniker, though of course the serverless code execution system itself, as opposed to individual users, likely maintains servers to support code execution. Serverless systems can be particularly well suited for processes with varying demand, as the serverless system can rapidly scale up and down the computing resources used to service such processes. In comparison to traditional systems using dedicated servers (physical or virtual), serverless systems often provide much higher efficiency with respect to computing resources used.

One challenge in serverless code execution systems is rapid provisioning of an execution environment (such as a virtual machine instance or software container) to support code execution. One approach is to await calls to execute a set of code, and in response to that call, to generate an execution environment for the code, provision the environment with the code, and execute the code. While effective, this approach can introduce significant latency into request handling, particularly as compared to a server that is pre-provisioned. For even moderately latency sensitive workloads, this approach may render serverless computing infeasible. Another approach is to pre-create environments on the serverless system and pre-provision those environments with all necessary data (e.g., operating systems, runtimes, libraries, etc.) to service any possible request to execute code. However, this approach largely negates the efficiency gains of serverless computing, and where a large amount of code is supported, may quickly overwhelm the resources of a serverless code execution system. Middling approaches, such as where a serverless code execution system attempts to predict future calls to execute code and to pre-provision environments for those calls, are possible. However, predicting future calls is difficult and generally inaccurate, leading either to excessive resource usage or excessive latency.

The scale of the above-noted problems is in many cases proportional to the size of data required to support execution of code. For code that depends on relatively small sets of data (e.g., on the order of kilobytes, single megabytes, tens of megabytes, etc.), the latency to provision environments "on-demand" (in response to a request to execute code) may be acceptable to an end user. Similarly, the computing resources needed to maintain a pre-provisioned environment for such a set of code may be minimal. However, many end users may desire to execute code that depends on larger sets of data. For example, an end user may desire to create a disk image that supports execution of code, including for example an operating system, runtime, libraries, the code itself, configuration files, or the like. On example of such a disk image is an image conforming to the Open Container Initiative (OCI) Image Specification, which is known in the art. Because of the type of data contained in such a disk image (e.g., a complete set of data facilitating execution of code, including an operating system), these images can be relatively large; often on the order of gigabytes in size. Attempting to either pre-provision environments with a large number of such images would quickly overwhelm many computing systems, while a naïve approach to on-demand provisioning of environments with such images, such as by transferring the whole image across a network to a device prior to executing the code, would introduce significant latency.

Embodiments of the present disclosure address these problems by providing for more efficient on-demand provisioning of environments with large data sets, such as disk images supporting code execution. More specifically, embodiments of the present disclosure enable "lazily" loading large data sets into an execution environment, by quickly providing a minimum portion of a data set needed to being execution of code, and providing additional portions of the data set on-demand from the code execution. More specifically, a request to execute code may be satisfied by provisioning an execution environment with access to a data set, without actually transferring the entire data set to a local storage drive for the environment. Instead, the data set may be made available via a file system that operates to selectively retrieve portions of the data set as they are read by the code execution. For example, a host computing device that is hosting an execution environment may be configured to provide a Filesystem in User Space (FUSE) storage device that—from the view of the execution environment—contains the data set. On reads to the FUSE storage device, a local FUSE agent may selectively retrieve any required portions of the data set and make the read portion of the data set available on the FUSE storage device. Thus, from the point of view of the execution environment, complete local access to the data set is provided. However, because the data set is "lazily" loaded, code execution can begin before the entire data set is transferred to the execution environment. Indeed, if the environment never requires access to a portion of the data set, that portion need never be transferred to the environment. As such, the latency to execute code is reduced.

Generally, transferring a portion of a data set to an execution environment can include transferring that data over a network. For example, the data set may be stored in a (logically) centralized network storage service, and portions of a data set may be transferred on-demand to an execution environment as code within that environment reads the data set. To minimize network latency, embodiments of the present disclosure can utilize a multi-level caching system for portions of data sets. For example, a host device hosting execution environments may provide a first level cache, such that recently read portions of data sets are stored on a storage drive of the host device and thus subsequent reads of those portions can be handled locally without network transfer. One or more distributed level two caching devices can provide a second level cache, whereby portions of data sets read by multiple execution environments among multiple host devices are stored within the second level cache. The second level cache may be closer to the host devices than the centralized network storage service, and/or have a network connection to the host devices that has more bandwidth than a connection between the host devices and the centralized network storage service. Thus, portions of data sets that are have not been read recently enough to be stored in a host-local cache may nevertheless be stored in the second level cache, enabling an execution environment to more quickly access those portions. In this configuration, the network storage service may act as a "origin" server for portions of the data set, such that if a portion exists in neither the first nor the second level cache, it can be retrieved from the network storage service.

While caching can improve performance of commonly-used data sets, latency may nevertheless be incurred due to "cache misses"—instances in which a read portion of a data set does not exist in either a local or level two cache. Such cache misses may be especially prevalent when data sets of different users are treated as distinct. In this configuration, it might be expected that only frequently executed code is associated with a cached data set, and that execution of other code would incur frequent cache misses to retrieve their associated data sets. Thus, to reduce the number of cache misses, it may be desirable to provide for sharing of portions between data sets. Typical disk imaging mechanisms do not provide for such sharing, or do so only in a limited fashion. To increase the number of shared portions among data sets, embodiments of the present disclosure may utilize the techniques disclosed in U.S. patent application Ser. No. 17/037,369, filed on Sep. 29, 2020 and entitled "EFFICIENT DEDUPLICATION USING BLOCK-BASED CONVERGENT ENCRYPTION" (the "'369 Application" the entirety of which is hereby incorporated by reference. As disclosed in more detail therein, each data set (e.g., disk image) may be divided into a set of portions (referred to in the '369 Application as "blocks" and generally referred to herein as portions or "objects") and encrypted using a convergent encryption process, such that if two portions of different data sets contain the same data, they result in identical encrypted portions. Each portion may additionally be identified according to a unique identifier derivable from the portion (and potentially other data), such as a hash value of the portion or message authentication code (MAC) for the portion. These portions may be of a fixed size, such as 512 kilobytes, across all data sets handled by a serverless code execution system. Accordingly, when two data sets provided to the serverless code execution system overlap in at least one fixed-size portion, that portion can be treated as shared. As such, when a first code execution attempts to read the shared portion, it may be cached such that other code executions may (if they are also associated with a data set that includes the shared portion) read the portion from the cache. Sharing of portions among code executions can therefore significantly reduce cache misses, decreasing the latency associated with a code execution reading data from a data set.

Another potential cause for latency when "lazily" transferring portions of data sets is the potential for failures or delays within the level two cache. For example, a device providing the level two cache may fail, meaning that attempts to retrieve a portion from that device would also fail. Even absent outright failure, such a device may experience partial failures or slowdowns that significantly delay transfer of a requested portion. Embodiments of this disclosure can provide a level two cache configured to overcome these problems by distributing data set portions among multiple devices within the level two cache. More specifically, embodiments of the present disclosure can utilize the technique of erasure coding (a known technique in the art) to divide a data set portion into a number of erasure-coded parts.

In accordance with known techniques of erasure coding, data (e.g., a file) can be divided into multiple parts, and reconstructed so long as a threshold number of those parts are known. For example, in a "5/1" erasure coding schema, data is divided into five parts and can be reconstructed so long as no more than one part is lost. An illustrative example of erasure coding is the use of a parity part. For example, data may be divided into two equally sized parts, and a third part may be constructed with each bit of the third part being a "exclusive or" (XOR) value of the corresponding bits of the respective first and second parts. In this example, loss of any single part can be tolerated, as the bits for the missing parts can be calculated from the values of the remaining two parts. A variety of more complex erasure coding techniques are known, enabling specification of a wide variety of "sizes" (e.g., number of parts) and loss tolerance thresholds.

In embodiments of the present disclosure, each portion of a disk image may be divided into a number of parts via erasure coding, which parts are then distributed among devices providing a level two cache. In this way, failures among the level two cache are tolerated up to the loss tolerance threshold of the erasure coding used. Moreover, this technique provides for improvements with respect to slowdowns as well as outright failures. Specifically, a host device may query a level two cache system for all parts of a requested portion, but begin to reconstruct the portion as soon as the minimum number of parts (the total number minus the loss tolerance threshold) are retrieved. In the instance that retrieval of parts experiences a "long tail" distribution (where one or more parts takes much longer to retrieve), this technique enables a host device to "cut off" that tail, servicing the request without delay due to the slower parts.

While examples above are provided with respect to disk images, embodiments of the present disclosure may be utilized to provide any number of data sets. For example, a serverless code execution system may in some instances utilize virtual machine snapshots (e.g., storing a state of random access memory (RAM), central processing unit (CPU) registers, etc.) to record a state of a virtual machine instance at a time that the instance is initialized to execute code. The serverless code execution system may then service requests to execute code by using these snapshots to recreate the virtual machine instance as reflected in the snapshot, which may potentially avoid delays such as booting an operating system. Illustrative techniques for use of snapshots to support rapid execution of code on a serverless code execution system are disclosed, for example, in U.S. patent application Ser. No. 16/045,593, filed Jul. 25, 2018 and entitled "REDUCING EXECUTION TIMES IN AN ON-DEMAND CODE NETWORK CODE EXECUTION SYSTEM USING SAVED MACHINE STATES" (the "'593 Application"), the entirety of which is hereby incorporated by reference. The techniques described herein may be utilized to provide such snapshots to execution environments, in addition or alternatively to disk images. Other types of data set may also be distributed using the techniques described herein. Thus, reference to a disk image as an example data set is intended for illustrative purposes.

Another problem that may occur when distributing data sets is that of garbage collection. In accordance with the above description, embodiments of the present disclosure may generate, for a given data set provided by an end user to support code execution, significant additional data. For example, a disk image may be divided into a number of portions stored on a network storage system. The disk image may further be used to generate a virtual machine snapshot, which snapshot may similarly be divided into portions stored on a network storage system. In the instance that the original data set is maintained, these disk image portions and snapshot portions may be viewed as additional data that support rapid execution of code, but are not strictly necessary to execute that code. Because the number of data sets (including disk images and snapshots) maintained by a serverless code execution system may be large, it may be desirable to limit the number of disk image portions or snapshot portions maintained on the network storage system. In a similar manner to traditional caching, for example, it may be desirable to maintain only disk image portions or snapshot portions that recently supported code execution, while deleting those portions that have not recently supported code execution. This process of deleting not-recently-used portions is referred to herein as "garbage collection."

While described in a simple manner above, garbage collection within a network storage system may in practice be a difficult problem. To support storage of a large volume of data, the network storage system may be distributed among multiple devices. A well-known issue in such distributed systems is that of "reference counting"—knowing how many processes rely on a specific piece of data at any given time. Typically, if a process relies on data, it is undesirable to garbage collect that data. However, the shared nature of data set (e.g., disk image or snapshot) portions used by present embodiments makes reference counting with respect to such portions difficult. For example, a process may communicate with each relevant device in the distributed system to detect that a given portion has not been accessed in a threshold period of time, and therefore may delete that portion. Unbeknownst to that process, a separate process may—during the data gathering of the first process—use the portion. Thus, deletion by the first process would result in an error to the second process. Accordingly, fine-grained usage tracking, such as at a portion level, may result in errors.

Embodiments of the present disclosure address this issue by providing coarse-grained garbage collection, in a manner that minimizes potential for errors in a serverless code execution system while still enabling efficient garbage collection. More specifically, a network storage system may store data set portions in a number of logically divided partitions, referred to herein as "roots" (as they represent a logical "root" object structure under which portions may be stored). Each root may undergo a lifecycle, beginning as an active root, to which new portions can be written, and later transitioning to an inactive root that does not support writing of portions. Transitioning between active and inactive may occur periodically, such as on a fixed time scale (e.g., within a few days, a week, two weeks, etc.), with new active roots created to replace those transitioning to an inactive state. Each newly created portion can be placed into an active root, from which the portion can later be read to support code execution. When that root is later transitioned to an inactive state, it may (at least initially) still support reading of the portion. However, on reading a portion from an inactive root, a migration process may also copy the portion into another active root, and further execution environments reliant on that portion can be configured to retrieve the portion from the active root. After a sufficient period of time without supporting a read (e.g., to designate a data set as subject to garbage collection), an inactive root may then be deleted, thus reclaiming resources used to store portions in the inactive root. Because reading from a root may pause the deletion process, the issue of reference counting is substantially reduced or eliminated. Moreover, because reading from an inactive root causes a portion to be copied to an active root, and subsequent environments to read from the active root, this technique enables unused portions to collect within inactive roots and be subject to garbage collection, while commonly used portions are continuously sifted out and "dragged forward" into each subsequent active root. Accordingly, this technique can provide for coarse-grained garbage collection that solves the problems associated with fine-grained garbage collection described above.

As will be appreciated by one of skill in the art in light of the present disclosure, the embodiments disclosed herein improve the ability of computing systems, such as serverless code execution systems, to support rapid execution of code reliant on a data set. Moreover, the presently disclosed embodiments address technical problems inherent within computing systems; specifically, the limited nature of computing resources available to store data sets and the difficulty of rapidly providing required data to code executions, when the variety of potential data and code executions is large. These technical problems are addressed by the various technical solutions described herein, including providing for "lazy," on-demand retrieval of data set portions that may be shared among multiple code executions, providing for a level two cache that utilizes erasure coding to provide resiliency and reduced request latency, and providing for a network storage system that implements coarse-grained garbage collection at the level of life-cycled logical storage partitions ("roots"). Thus, the present disclosure represents an improvement on serverless code execution systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which client devices 102 may interact with a serverless code executions system 110 via a network 104. By way of illustration, various example client devices 102 are shown in communication with the serverless code execution system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The serverless code execution system 110 may provide the user computing devices 102 with one or more user interfaces, command-line interfaces (CLI), application programming interfaces (API), and/or other programmatic interfaces for generating and uploading user-executable source code (e.g., as part of a disk image or in association with a data set depended on by the code), invoking the user-provided source code (e.g., submitting a request to execute the source code on the on-demand code execution system 110), scheduling event-based code executions or timed code executions, tracking the user-provided source code, and/or viewing other logging or monitoring information related to their requests and/or source code. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the serverless code execution environment 110 to implement desired functionality on behalf of a user. Auxiliary services 106 can correspond to network-connected computing devices, such as servers, which generate data accessible to the serverless code execution environment 110 or otherwise communicate to the serverless code execution environment 110. For example, the auxiliary services 106 can include web services (e.g., associated with the user computing devices 102, with the serverless code execution system 110, or with third parties), databases, really simple syndication ("RSS") readers, social networking sites, or any other source of network-accessible service or data source. In some instances, auxiliary services 106 may be invoked by code execution on the serverless code execution system 110, such as by API calls to the auxiliary services 106. In some instances, auxiliary services 106 may be associated with the serverless code execution system 110, e.g., to provide billing or logging services to the serverless code execution system 110. In some instances, auxiliary services 106 actively transmit information, such as API calls or other task-triggering information, to the serverless code execution system 110. In other instances, auxiliary services 106 may be passive, such that data is made available for access by the serverless code execution system 110. For example, components of the serverless code execution system 110 may periodically poll such passive data sources, and trigger execution of code within the serverless code execution system 110 based on the data provided. While depicted in FIG. 1 as distinct from the user computing devices 102 and the serverless code execution system 110, in some embodiments, various auxiliary services 106 may be implemented by either the user computing devices 102 or the serverless code execution system 110.

The client devices 102, auxiliary services 106, and serverless code execution system 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The serverless code execution system 110 is depicted in FIG. 1 as operating in a distributed computing environment including several computer systems that are interconnected using one or more computer networks (not shown in FIG. 1). The serverless code execution system 110 could also operate within a computing environment having a fewer or greater number of devices than are illustrated in FIG. 1. Thus, the depiction of the serverless code execution system 110 in FIG. 1 should be taken as illustrative and not limiting to the present disclosure. For example, the serverless code execution system 110 or various constituents thereof could implement various Web services components, hosted or "cloud" computing environments, and/or peer to peer network configurations to implement at least a portion of the processes described herein.

Further, the serverless code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the serverless code execution system 110 is illustrated as connected to the network 104. In some embodiments, any of the components within the serverless code execution system 110 can communicate with other components of the serverless code execution system 110 via the network 104. In other embodiments, not all components of the serverless code execution system 110 are capable of communicating with other components of the environment 100. In one example, only the frontends 120 may be connected to the network 104, and other components of the serverless code execution system 110 may communicate with other components of the environment 100 via the frontends 120.

In FIG. 1, users, by way of user computing devices 102, may interact with the serverless code execution system 110 to provide source code, and establish rules or logic defining when and how such code should be executed on the serverless code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the serverless code execution system 110, and request that the on serverless code execution system 110 execute the code using one or more execution environments that are managed by the system 110. The serverless code execution system 110 can handle the acquisition and configuration of compute capacity (e.g., containers, instances, etc., which are described in greater detail below) based on the code execution request, and execute the code using the compute capacity. The serverless code execution system 110 may automatically scale up and down based on the volume of request to execute code, thereby relieving the user from the burden of having to worry about over-utilization (e.g., acquiring too little computing resources and suffering performance issues) or under-utilization (e.g., acquiring more computing resources than necessary to run the code, and thus overpaying).

To enable interaction with the serverless code execution system 110, the system 110 includes multiple frontends 120, which enable interaction with the serverless code execution system 110. In an illustrative embodiment, the frontends 120 serve as a "front door" to the other services provided by the serverless code execution system 110, enabling users (via user computing devices 102) to provide, request execution of, and view results of computer executable source code. The frontends 120 include a variety of components to enable interaction between the serverless code execution system 110 and other computing devices. For example, each frontend 120 may include a request interface providing user computing devices 102 with the ability to upload or otherwise communication user-specified code and associated data sets to the on-demand code execution system 110 (e.g., in the form of a disk image) and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the source code specified in the request.

References to source code as used herein may refer to any program code (e.g., a program, routine, subroutine, thread, etc.) written in a specific program language. In the present disclosure, the terms "source code," "user code," and "program code," may be used interchangeably. Source code which has been compiled for execution on a specific device is generally referred to herein as "machine code." Both "source code" and "machine code" are representations of the same instructions, which may be collectively referred to as "code." Such code may be executed to achieve a specific function, for example, in connection with a particular web application or mobile application developed by the user. As noted above, individual collections of code (e.g., to achieve a specific function) are referred to herein as "tasks" or "functions," while specific executions of that code are referred to as "task executions," "function executions," "code executions," or simply "executions." Source code for a task may be written, by way of non-limiting example, in JavaScript (e.g., node.js), Java, Python, and/or Ruby (and/or another programming language). Tasks may be "triggered" for execution on the serverless code execution system 110 in a variety of manners. In one embodiment, a user or other computing device may transmit a request to execute a task may, which can generally be referred to as "call" to execute of the task (e.g., a "task call," a "function call," etc.). Such calls may include an identifier of the task to be executed and one or more arguments to be used for executing the task. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

Prior to calling for execution of a task, an end user may submit code for the task and associated data to be used to execute the task. In one embodiment, the code is provided in the form of a disk image containing the code and other data that the code may use during execution. The disk image and associated metadata for the task (e.g., the end user who "owns" the task or other information regarding the task) may be stored within an object storage system 190. The object storage system 190 of FIG. 1 may represent any of a number of object storage systems, such as AMAZON™'s SIMPLE STORAGE SERVICE™ (or "S3™"). In accordance with embodiments of the present disclosure, a disk image may further be divided into a number of portions, each stored as a separate object on the object storage system 190. These portions may be stored within an object root 194 on the storage system 190, which represents a logical partition of the storage system 190. As discussed in more detail below, objects within each root 194 may be used to facilitate low latency execution of code, and individual roots may be life-cycled and subject to garbage collection to facilitate removal of unused portions from the system. In one embodiment, submission of a disk image or other data set to the serverless code execution system 110 may cause the system 110 (e.g., via the frontends 120) to generate a set of portions representing the disk image or data set, and to store such portions in an "active" status object root 194. Generation of portions from a data set is described in more detail in the '369 Application, incorporated by reference above. In another embodiment, portions may be generated on an initial call to execute code.

Additionally or alternatively, roots 194 of the object storage service 190 may be used to store other data set portions, such as portions representing a snapshot of a virtual machine instance at a particular point in time (e.g., when initialized to support execution of corresponding code). Creation of such snapshots is discussed in more detail in the '593 Application, incorporated by reference above. Portions for such snapshots may be created, for example, according to the techniques of the '369 Application when applied to such snapshots as an input data set.

In accordance with the teachings of the '369 Application, each data set may be represented in the object storage system 190 as a combination of portions, as well as a manifest that lists the combination of portions that collectively represent that data set. For example, each data set may be associated with a manifest that lists a set of identifiers for data set portions (e.g., "chunks"), such that a device with access to the manifest can retrieve the chunks and recreate the data set. In embodiments where portions are encrypted, a manifest can further include information enabling decryption of those portions, such as the encryption key by which each portion was encrypted. In one embodiment, manifests are stored alongside portions within a given root 194. In another embodiment, manifests are stored separately on the object storage system 190.

As shown in FIG. 1, the object storage system 190 further includes a root manager 192, which is illustratively configured to manage life cycling of roots 194, and to facilitate identification of the status of roots 194. For example, the root manager 192 can provide interfaces enabling other elements of the system 110 to query for a set of roots 194 in a given life cycle state corresponding to a stage of the lifecycle (e.g., "active"), and provide a list of such roots 194 in return. Further, and as discussed in more detail below, the root manager 192 may facilitate transitioning of roots 194 between life cycle states, including copying of portions between different roots 194 based on indicators of use of such portions.

While not shown in FIG. 1, the object storage system 190 may include a variety of data stores other than object roots 194, which may not be subject to, for example, the garbage collection techniques described herein. These other data stores may be used, for example, to store "original" data sets provided by end users, such that portions of disk images, snapshots, etc., may be recreated from original data sets even if such disk image or snapshot portions are subject to garbage collection. These other data stores may additionally be used, for example, to store metadata regarding a function.

After a user has created a task on the serverless code execution system 110, the system 110 may accept calls to execute that task. To calls to execute a task, the frontend 120 can include an execution queue, which can maintain a record of requested task executions. Illustratively, the number of simultaneous task executions by the serverless code execution system 110 is limited, and as such, new task executions initiated at the serverless code execution system 110 (e.g., via an API call, via a call from an executed or executing task, etc.) may be placed on the execution queue and processed, e.g., in a first-in-first-out order. In some embodiments, the on-demand code execution system 110 may include multiple execution queues, such as individual execution queues for each user account. For example, users of the serverless code execution system 110 may desire to limit the rate of task executions on the serverless code execution system 110 (e.g., for cost reasons). Thus, the serverless code execution system 110 may utilize an account-specific execution queue to throttle the rate of simultaneous task executions by a specific user account. In some instances, the serverless code execution system 110 may prioritize task executions, such that task executions of specific accounts or of specified priorities bypass or are prioritized within the execution queue. In other instances, the serverless code execution system 110 may execute tasks immediately or substantially immediately after receiving a call for that task, and thus, the execution queue may be omitted.

As noted above, tasks may be triggered for execution at the serverless code execution system 110 based on explicit calls from user computing devices 102 (e.g., as received at a request interface). Alternatively or additionally, tasks may be triggered for execution at the serverless code execution system 110 based on data retrieved from one or more auxiliary services 106w. To facilitate interaction with auxiliary services 106, the frontend 120 can include a polling interface, which operates to poll auxiliary services 106 for data. Illustratively, the polling interface may periodically transmit a request to one or more user-specified auxiliary services 106 to retrieve any newly available data (e.g., social network "posts," news articles, files, records, etc.), and to determine whether that data corresponds to user-established criteria triggering execution a task on the serverless code execution system 110. Illustratively, criteria for execution of a task may include, but is not limited to, whether new data is available at the auxiliary services 106, the type or content of the data, or timing information corresponding to the data. In some instances, the auxiliary services 106 may function to notify the frontend 120 of the availability of new data, and thus the polling service may be unnecessary with respect to such services.

In addition to tasks executed based on explicit user calls and data from auxiliary services 106, the serverless code execution system 110 may in some instances operate to trigger execution of tasks independently. For example, the serverless code execution system 110 may operate (based on instructions from a user) to trigger execution of a task at each of a number of specified time intervals (e.g., every 10 minutes).

The frontend 120 can further includes an output interface configured to output information regarding the execution of tasks on the serverless code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

Code executions triggered on the serverless code execution system 110 of FIG. 1 are executed by execution environments hosted by a set of workers 181 within a worker fleet 180. Each worker 181 is illustratively a host device configured to host multiple execution environments, which in FIG. 1 are virtual machine instances 183. Execution environments may alternatively include software containers, sometimes referred to as "OS-level virtualization," another virtualization technology known in the art. Thus, where references are made herein to VM instances 183, it should be understood that (unless indication is made to the contrary) a container may be substituted for such instances 183.

While only a single instance 183 is shown in FIG. 1, each worker 181 may host a number of instances 183. Each instance 183 may be isolated from other instances 183, thus ensuring the security of code executions on the serverless code execution system 110. For example, each instance 183 may be divided by a virtualization boundary, by virtue of the instance 183 being a virtual machine hosted by the worker 181. In addition, each instance 183 may exist within a partitioned user space 182 on the worker 181, which logically partitions resources of the worker 181 among instances 183. Each user space 182 may, for example, represent a "chroot" jail—a known isolation technique for LINUX™ operating systems.

To facilitate rapid execution of code, each worker 181 may be configured to maintain a set of instances 183 in a "pre-warmed" state, being at least partially configured to begin execution of code. For example, instances may be created on the worker and configured with access to computing resources (CPU, RAM, drive storage, etc.). In accordance with embodiments of the present disclosure, it may be impractical or impossible to maintain instances 183 in a fully warmed state for all possible code executions, as executions may be associated with a wide variety of at least partially distinct data sets (e.g., disk images and/or snapshots). Thus, instances 183 may be maintained in a "greatest commonality" for a given group of tasks, such as being provisioned with a set of computing resources common to those tasks, being configured to accept an operating system type used by those tasks, etc. \

On receiving instructions to provision an instance 183 to support execution of the task, the worker 181 may adjust the configuration of the instance 183 to support that execution. Specifically, and in accordance with embodiments disclosed herein, the worker 181 may provision the instance 183 with access to a disk image or snapshot corresponding to the task, in a manner that does not require that disk image or snapshot to be fully transferred to local storage of the worker 181 prior to use. Rather, the worker 181 may provide to an instance 183 what appears to be full local access to the disk image or snapshot, while "lazily" retrieving portions of that image or snapshot in response to a request to read such portions. In one embodiment, apparent full local access is provided by a file system process 184, which illustratively represents a FUSE module executing within the user space 182. The file system process 184 may illustratively accept read requests from the instance 183, and interact with a local object manager 188 of the worker 181 to obtain the requested data. To facilitate read requests, the file system process 184 is provided access to an image manifest 186, which illustratively lists a set of portions (e.g., data objects) that collectively represent the disk image or snapshot. For example, the manifest 186 may include a set of identifiers of the portions, a particular root 194 of the object storage system 190 in which the portions are stored, encryption keys by which each portion is encrypted, and information mapping particular logical locations within the disk image or snapshot (e.g., logical block addresses, or "LBAs") to particular portions. Thus, on receiving a request to read a given range of bytes of a disk image or snapshot, the file system process 184 may, from the request and the manifest 186, identify a particular portion storing the range of bytes, and may request access to that portion from the local object manager 188.

The local object manager 188, in turn, represents code executing on the worker 181 and configured to provide the file system process 184 with access to the requested portion. For example, the local object manager 188 may obtain a request to access a portion, and if the portion is not available within a cache, retrieve that portion from an object root 194 (which root 194 may be identified within the request). On retrieving the portion, the portion may be placed within the object cache 189, which represents "level one" cache of the local object manager 188 (though note the instance 183 itself may implement caches, such as a "page cache" of read data). In one embodiment, the object cache 189 represents a memory-mapped file on a file system of the worker 181, which may be stored for example on high speed storage of the worker 181 to facilitate rapid access by file system processes 184. For example, the object cache 189 may be stored wholly or partly within RAM of the worker 181, and wholly or partly within other high speed storage (e.g., a solid state drive (SSD), 3D XPOINT memory, flash memory, etc.). The object cache 189 may be sized such that it can hold hundreds, thousands, or millions of portions. For example, individual portions may be 512 kb objects, while the cache 189 is hundreds of gigabytes or terabytes in size. On retrieving a requested portion, the local object manager 188 may place the portion into the object cache 189 and return to a requesting file system process 184 a pointer to a location within the cache 189 holding the portion. The process 184 may then read the portion from the location, thus enabling satisfaction of a read request from a VM instance 183.

In one embodiment, each instance 183 is associated with a distinct file system process 184 within its respective user space 182, while each worker 181 includes a single local object manager 188 and object cache 189. Accordingly, multiple instances 183 may gain shared access to the object cache 189. As noted above, multiple data sets of different tasks may overlap with respect to at least some portions. Thus, shared access to the object cache 189 can significantly reduce "cache misses" by enabling a portion retrieved based on a request from one instance 183 to also service requests from another instance 183. For example, where two instances 183 utilize the same operating system, it is likely that a significant percentage of their respective disk images—the portion storing the operating system—overlap. Thus, portions of the disk image would also be expected to overlap, and executions of the two tasks may effectively share access to those portions within the object cache 189. In some instances, the object cache 189 may be "seeded" with commonly used portions prior to execution of any tasks, such as by storing within the cache 189 portions associated with commonly used operating systems, runtimes, libraries, etc. In some instances, these seeded portions may be exempted from cache eviction policies that might otherwise be applied to the cache 189 by the local object manager 188. Portions within the object cache 189 are illustratively maintained as "read only," such that an instance 183 is unable to modify the portion. Nevertheless, a corresponding disk image or snapshot may in some instances be viewed as writable by instances 183. For example, the file system process 184 may provide the disk image or snapshot using a "copy on write" mechanism, whereby an attempt to write to the disk image or snapshot by the instance 183 causes a modified version of the image or snapshot to be stored in other storage.

The local object manager 188 may, during operation, manage the cache 189 to ensure proper operation. For example, the manager 188 may implement a cache eviction policy, such as deleting one or more least-recently-read portions when storage space of the cache 189 falls below a threshold level. To facilitate cache eviction, the manager 188 may maintain a "reference count" for each portion, indicating a number of instances 183 reading a given portion. For example, each request from a file system process 184 to read a portion may increment a reference count for the portion, while a "close" operation from a process 184 or failure of the process 184 (e.g., a crash) may decrement the reference count. As such, the object manager 188 may maintain information as to which portions are currently in use, in order to facilitate cache eviction.

The file system process 184 and local object manager 188 may communicate via any number of known intra-device techniques. For example, each process 184 may, on initialization, create a Unix socket connection to the manager 188 to facilitate communication.

In addition to the object cache 189 on a given worker 181, the local object manager 188 of FIG. 1 also has access to a level two cache, provided by a set of distributed level two cache devices 170. Each device 170 illustratively represents a server configured to store erasure-coded parts of objects used by the local object manager 188 (e.g., each object being a portion of a data set, such as a disk image or snapshot). Erasure-coded parts are stored within an object part store 172, which may be any persistent or substantially persistent storage of the devices 170. The level two cache devices 170 illustratively provided the local object managers 188 with higher bandwidth access to data that the object storage system 190, such as by being located close to the worker fleet 180 in terms of network distance, having higher speed data storage or network connections, etc. As discussed above, rather than directly storing objects (data set portions), each device 170 may store erasure coded parts of objects, such that the object can be recreated with less than all such parts. As discussed in more detail below, storage of parts within the level two cache devices 170 may be controlled by the local object managers 188 of each worker 181. For example, on retrieving an (uncached) object from the object storage system 190, a local object manager 188 may erasure-encode the object into multiple parts, and then store those parts on a set of devices 170. When another worker 181 desires to retrieve the object, the local object manager 188 of that worker 118 may retrieve the necessary parts of the object from those devices 170 and re-create the object from the parts, thus avoiding delay associated with retrieval of the object from the object storage system 190.

In addition, the system 110 includes a number of components for facilitating distribution of calls to execute a task from frontends 120 to particular VM instances 183. For example, the serverless code execution system 110 includes one or more worker managers 140 configured to manage execution environments (e.g., virtual machine instances) hosted by workers 181 among a worker fleet 180. The worker managers 140—each of which are illustratively implemented as physical or virtual-on-physical devices—illustratively "lease" particular VM instances 183 within the fleet 180, thus gaining operational control to, for example, instruct virtual machine instances 183 to execute code of the task. Thus, on receiving a call to execute a task, a frontend 120 may distribute the call to a worker manager 140, which may identify a currently-leased VM instance 183 in which to implement the task, and cause the instance 183 to implement the task. Example interactions for distributing a call from a frontend 120 to a worker manager 140 are described, for example, in U.S. patent application Ser. No. 16/698,829, entitled "SERVERLESS CALL DISTRIBUTION TO UTILIZE RESERVED CAPACITY WITHOUT INHIBITING SCALING" and filed Nov. 27, 2019, the entirety of which is hereby incorporated by reference.

In the instance that a worker manager 140 does not currently lease a VM instance 183 corresponding to the called task, the worker manager 140 can contact a placement service 160 to request a lease on an additional instance 183, which is illustratively configured to grant to the worker managers 140 leases to individual VM instances 183. Illustratively, the placement service 160 may maintain state information for VM instances 183 across the fleet 180, as well as information indicating which manager 140 has leased a given instance 183. When a worker manager 140 requests a lease on an additional instance 183, the placement service 160 can identify an appropriate instance 183 (e.g., warmed with software and/or data required to support a call to implement a task) and grant to the manager 140 a lease to that instance 183. In the case that such an instance 183 does not exist, the placement service 160 can instruct a worker 181 to create such an instance 183 (e.g., by creating an instance 183 or identifying an existing unused instance 183, storing an appropriate data manifest 186 for a required disk image, snapshot, etc. in a user space 182 of that instance 183, and configuring the file system process 184 to provide access to the required data set) thereafter grant to the worker manager 140 a lease to that instance 183, thus facilitating execution.

In accordance with embodiments of the present disclosure, the placement service 160 may also act to notify the root manager 192 on creation of an instance 183 using a particular data set. For example, the placement service 160 may, when gathering state information indicating currently leased instances 183, identify one or more data sets that such instances 183 rely on, and notify the root manager 192 that such data sets are being accessed. As discussed in more detail below, the root manager 192 may use this information to facilitate copying of data between roots 194 as well as transitioning of roots 194 between life cycle states.

Figure 2:
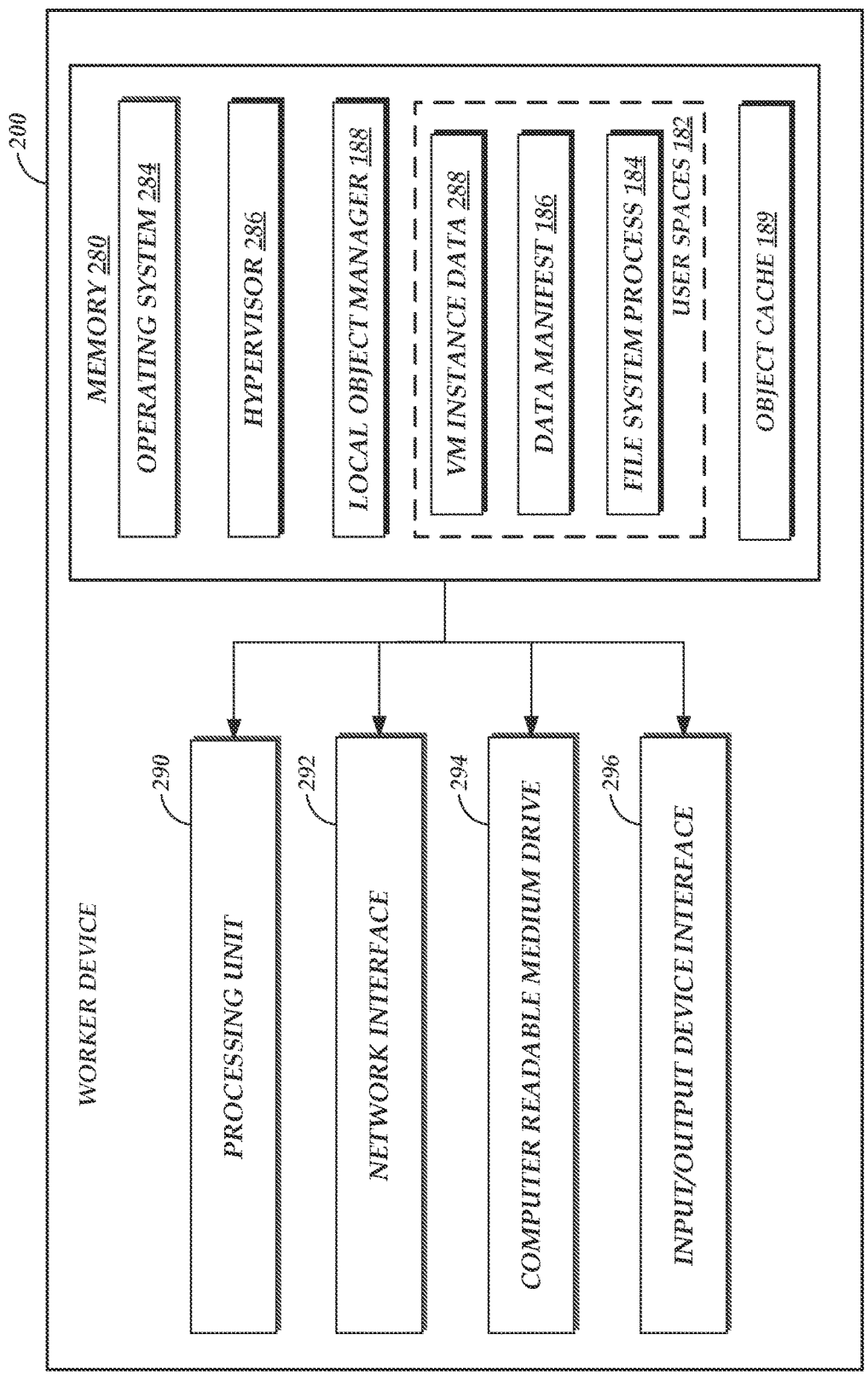
FIG. 2 depicts a general architecture of a computing device providing a worker of FIG. 1, which may host execution environments supporting execution of code and may provide rapid access to data sets relied on by such executions.

FIG. 2 depicts a general architecture of a computing system (a worker device 200) implementing the worker 181 of FIG. 1. The general architecture of the device 200 depicted in FIG. 2 includes an arrangement of computer hardware and software that may be used to implement aspects of the present disclosure. The hardware may be implemented on physical electronic devices, as discussed in greater detail below. The device 200 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 2.

As illustrated, the device 200 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as units in some embodiments) that the processing unit 290 executes in order to implement one or more aspects of the present disclosure, along with data used to facilitate or support such execution. While shown in FIG. 2 as a single set of memory 280, memory 280 may in practice be divided into tiers, such as primary memory and secondary memory, which tiers may include (but are not limited to) RAM, 3D XPOINT memory, flash memory, magnetic storage, and the like. For example, primary memory may be assumed for the purposes of description to represent a main working memory of the device 200, with a higher speed but lower total capacity than a secondary memory, tertiary memory, etc.

The memory 280 may store an operating system 284 that provides computer program instructions for use by the processing unit 290 in the general administration and operation of the device 200. The memory 280 may further include computer program instructions and other information for implementing aspects of the present disclosure. For example, in one embodiment, the memory 280 includes a hypervisor 286 to facilitate creation and management of virtual machine instances 183. While shown as distinct from the operating system 284, the hypervisor 286 and operating system 284 may in some cases be combined. For example, the operating system 284 may be a LINUX operating system executing a Kernel-based Virtual Machine (KVM) virtualization module that acts as the hypervisor 286.

In addition, the memory 280 includes a local object manager 188, which as described above is configured to handle requests from VM instances 183 to read data from a data set, and an object cache 189 representing a set of objects (data set portions) cached locally to the device 200, such as in the form of a memory mapped file. The memory 280 further includes multiple user spaces 182, each of which represents a logically isolated portion of memory 280 associated with a particular VM instance 183. Each user pace 182 illustratively includes VM instance data 288 (data supporting execution of an instance 183), a data manifest 186 that identifies data set portions representing a data set used by a serverless code execution in the instance 183, and a file system process 184 that facilitates interaction between the VM instance 183 and the local object manager 188. In combination, the elements of the memory 280, when executed on the device 200, enable implementation of embodiments of the present disclosure.

The device 200 of FIG. 2 is one illustrative configuration of such a device, of which others are possible. For example, while shown as a single device, a device 200 may in some embodiments be implemented as a logical device hosted by multiple physical host devices. In other embodiments, the device 200 may be implemented as one or more virtual devices executing on a physical computing device. While described in FIG. 2 as a worker device 200, similar components may be utilized in some embodiments to implement other devices shown in the environment 100 of FIG. 2, such as level two cache devices 170, a root manager 192, etc.

Figure 3:
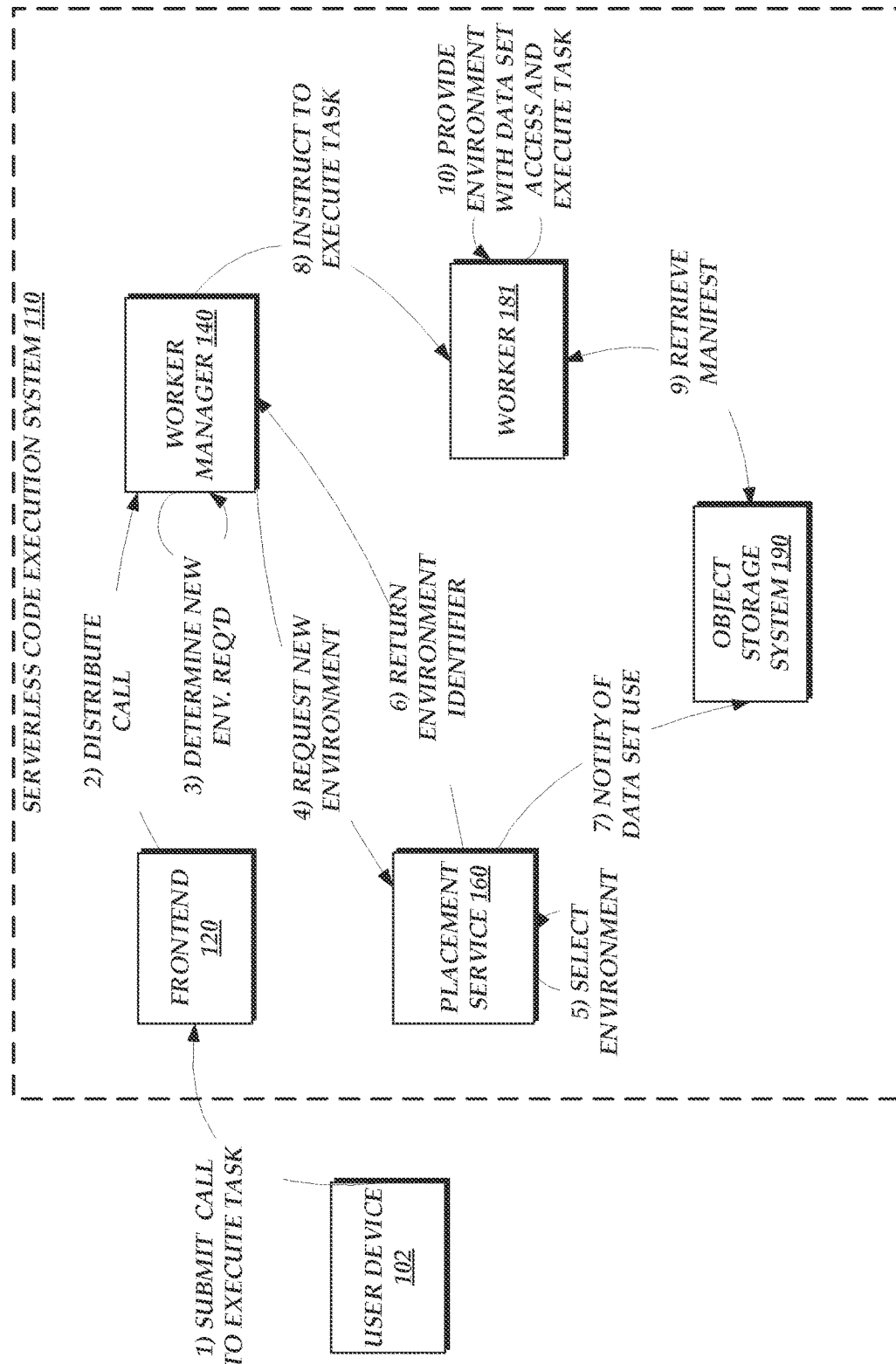
FIG. 3 is a flow diagram depicting illustrative interactions for handling a request to execute code on the serverless code execution system of FIG. 1, including providing an execution environment for the code with rapid access to a data set on which execution of the code relies.

With reference to FIG. 3, illustrative interactions are depicted for handling a request to execute a task on the serverless code execution system 110, including provisioning an environment with lazily-retrieved access to a data set to improve the latency for handling such a request.

The interactions of FIG. 3 begin at (1), where a user device 102 submits a call to the frontend 120 to execute the task. Submission of a request may include transmission of specialized data to the frontend 120, such as a HTTP packet or API call referencing the task. While the interactions of FIG. 3 are described as including an explicit request to execute the task by the user device 102, requests to execute the task may occur in a variety of manners, including submission of a call by auxiliary services 106 (not shown in FIG. 3) or generation of a call by the serverless code execution system 110 (e.g., based on a rule to call the alias when specific criteria are met, such as elapsing of a period of time or detection of data on an auxiliary service 106). The request may include any information required to execute the task, such as parameters for execution, authentication information under which to execute the task or to be used during execution of the task, etc.

At (2), frontend 120 distributes the call to a worker manager 140. The frontend 120 may implement various functionalities to distribute the call, such as selecting the worker manager 140 based on random selection, load, etc. In some instances, the frontend 120 may maintain information identifying a worker manager 140 previously associated with a called task, and distribute the call to that worker manager 140. Various additional functionalities that may be implemented by a frontend 120 to distribute calls to a worker manager 140 are described, for example, in U.S. patent application Ser. No. 16/698,829, entitled "SERVERLESS CALL DISTRIBUTION TO UTILIZE RESERVED CAPACITY WITHOUT INHIBITING SCALING," which is hereby incorporated by reference in its entirety.

In some instances, the worker manager 140 may determine that an appropriate environment (e.g., a VM instance 183) already exists within the worker fleet 180, and may thus execute an instance of the called task within that environment. However, for purposes of the present description, it will be assumed that no such environment exists. Accordingly, at (3), the manager 140 determines that a new execution environment is required to service the call. The manager 140 therefore, at (4), requests the new environment from the placement service 160.

Thereafter, at (5), the placement service 160 selects an appropriate environment (e.g., from among pre-warmed but not yet leased environments of the fleet 180), and returns a response to the manager 140 at (6). The response to the manager 140 may include, for example, identifying information of the environment, which the manager 140 may utilize to instruct the environment to initiate an execution of the called task. The response may further include information identifying a manifest for a data set to be used to support execution of the task, which may be retrieved, for example, from metadata of the task stored on the system 110 (e.g., in the object storage system 190).

In addition, at (7), the placement service 160 may notify the object storage service 190 (e.g. a root manager 192) that the relevant data set (that used to support execution of the task) is in use. As discussed in more detail below, this notification may be used by the root manager 192 to facilitate garbage collection on the object storage system 190. While FIG. 3 depicts notification on selection of an environment, the placement service 160 may additionally or alternatively report data set use periodically. For example, the placement service 160 may be configured to maintain a system-wide view of environments leased among worker managers 140, each of which is linked to a corresponding task, as well as data sets used to support execution of those tasks. Thus, the placement service 160 may periodically determine which data sets are associated with leased environments, and report use of those data sets to the object storage system 190.

While FIG. 3 depicts direct communication between the placement service 160 and the object storage system 190, in some instances the system 110 may include additional elements that facilitate this communication. For example, the system 110 may include a task lifecycle management system (not shown in FIG. 1) configured to maintain state information as to the tasks on the system 110, which state information may include for example a status of the task as "accelerated" (e.g., having associated therewith a data set made rapidly available via embodiments of the present disclosure) or "non-accelerated" (e.g., by not having associated therewith such a data set, either by having no data set associated therewith or having a data set associated therewith that has not been made rapidly available via the present embodiments). Illustratively, a task may enter an "accelerated" state when the appropriate data set for the task has been divided into portions stored within a root of the object storage system 190, such as on creation of the task, and may enter a non-accelerated state after a threshold period of time of non-use, corresponding to expected deletion of the portions from the object storage system 190. Thus, the placement service 160 may transmit the notification at (7) to the task lifecycle management system, which may in turn transmit the notification to the object storage system 190. In some instances, the task lifecycle management system may obtain notifications from the placement service 160 on creation of an execution environment for a task, while the task lifecycle management system may "batch" report notifications of use to the object storage system 190 on a periodic basis (e.g., every 6, 12, or 24 hours).

On receiving information identifying the execution environment, the worker manager 140, at (8), instructs the worker 181 hosting the environment to execute the called task within the environment. The worker 181, in turn, retrieves from the object storage system 190, at (9), a manifest for the relevant data set (e.g., from a location included within the instructions of the worker manager 140). The worker 181 then at (10) provides the environment with access to the relevant data set, and begins execution of the task within the environment. For example, the worker may modify a VM instance 183 as necessary to match a necessary configuration to support execution of the task, and "mount" the data set as a virtual storage drive of the instance 183, or as a file accessible to the instance 183. As noted above, the data set may be provided in a manner that provides complete local access to the data set, but does not actually require complete transfer of the data set to the worker 181 prior to providing that access. Instead, portions of the data set can be retrieved as they are requested from the VM instance 183. Accordingly, providing the environment with access to the data set is expected to incur significantly lower latency than attempting to completely transfer the data set to the worker 181 prior to execution of the task.

The interactions of FIG. 3 are illustrative, and may be modified in some embodiments. For example, the placement service 160 may be responsible for initializing an execution environment on the worker 181. Illustratively, on selection of an environment (e.g., at (5)), the placement service 160 may remotely connect to the worker 181 to configure the environment, including providing to the environment a manifest for the data set, configuring the file system process 184 to provide local access to the data set, and the like. As another example, frontends 120 may in some configurations be configured to pass instructions to execute a task to workers 181. Illustratively, a frontend 120 may, rather than distributing a call at (2), transmit a request to the worker manager 140 to identify an environment on a worker 181 to which the call should be distributed. After identifying that environment (e.g., via interactions (3) through (6)), the worker manager 140 may return to the frontend 120 connection information for the environment, such as an IP address. The frontend 120 can then distribute the call directly to the environment, rather than passing the call through the manager 140. Other modifications to the interactions of FIG. 3 are possible.

Figure 4:
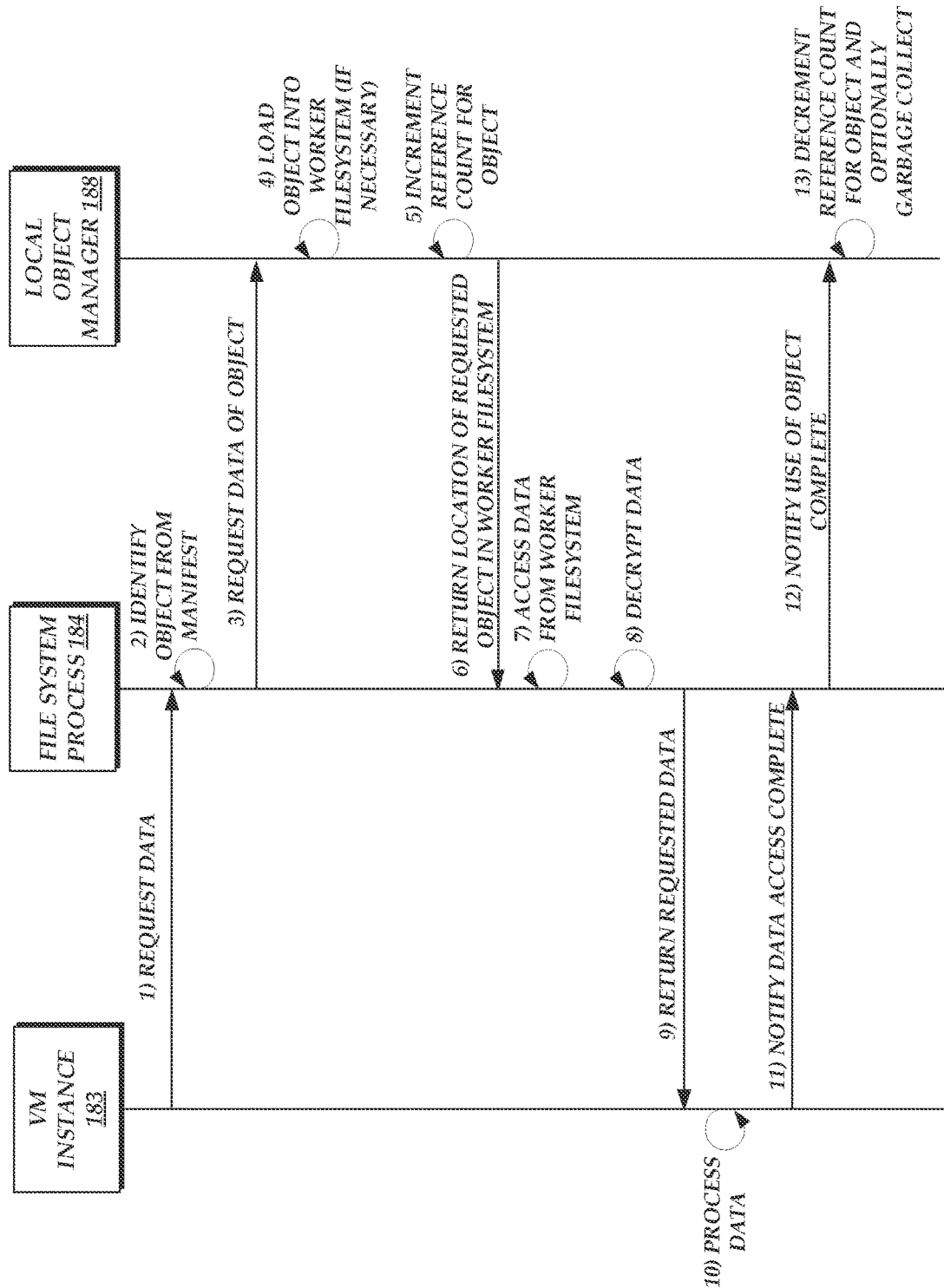
FIG. 4 is a flow diagram depicting illustrative interactions for handling requests to read a data set by an execution environment that has been provisioned with rapid access to the data set.

With reference to FIG. 4, illustrative interactions will be described for reading from a data set by a VM instance 183, in accordance with embodiments of the present disclosure. The interactions of FIG. 4 may facilitate, for example, reading bytes from a disk image to support booting of an operating system or a runtime, execution of code, etc. The interactions of FIG. 4 may similarly facilitate reading from a snapshot to facilitate restoration of a virtual machine state captured in that snapshot.

The interactions of FIG. 4 begin at (1), where a VM instance 183 provided with access to a data set (e.g., via the interactions of FIG. 3) requests to read data of the data set. For example, the VM instance 183 may attempt to read a set of blocks of the data set, identified by a particular location within the data set (e.g., logical block addresses within the disk image). In FIG. 4, the disk image is illustratively mounted as a Filesystem in User Space (FUSE) filesystem. Accordingly, the request is routed (e.g., by the operating system of the worker 181) to the file system process 184, which illustratively represents a FUSE module provided the FUSE filesystem.

At (2), the file system process 184 identifies an object of the object storage system 190 that stores the requested data. As noted above, the file system process 184 can be provided with a manifest that maps locations within the data set (e.g., block offsets) to objects on the object storage system 190, which represent portions of the data set. Thus, by reference to the manifest, the file system process 184 may identify the object. The object may be identified by a name, which illustratively represents a globally unique identifier (GUID) (also known as a universally unique identifier, or UUID) of the object. The name may be generated, for example, as a hash value or media access control (MAC) value of the object. The object may further be identified in the manifest by an object root 194 of the object storage system 190, to facilitate garbage collection on the system 190.

At (3), the file system process 184 then requests data of the object from the local object manager 188 of the worker 181. As noted above, the local object manager 188 can represent a process executing on the worker 181 that facilitates retrieval of objects from a variety of potential sources (e.g., cache levels, an origin, etc.). In one embodiment, the file system process 184 executes within a user space shared with the VM instance 183, while the local object manager 188 executes outside that user space, and the process 184 and manager 188 communicate via a UNIX socket or other intra-device communication system.

At (4), the local object manager 188 loads the requested object into a system of the worker 181, if not already existing therein. Details of this loading are described in more detail below with respect to FIG. 4. However, in brief, the local object manager 188 may maintain a local cache, such as a memory-mapped file, storing multiple objects that have been requested by various VM instances 183 executing on the worker 181. Thus, if the local cache already includes the requested object, the manager 188 may simply use that object without re-loading the object into the cache. If the local cache does not include the object, the manager 188 retrieves the object from one of a variety of potential sources.

As discussed above, the local object manager 188 illustratively provides access to objects to multiple instances 183, and as such an object may be used by more than one instance 183 at a given time. Because space in the local cache is necessarily limited, it may be necessary for the manager 188 to eventually delete one or more objects from the local cache. The manager 188 can therefore be configured to track use of objects by instances 183, to prevent where possible deletion of a currently-used object. Accordingly, at (5), the manager 188 increments a reference count for the object, indicating that the object is being read by the VM instance 183. In one embodiment, a non-zero reference count for an object prevents deletion of the object from the local cache (excepting edge case scenarios, such as the entire cache being filled with objects having a non-zero reference count).

At (6), the local object manager 188 returns to the file system process 184 a location of the requested object in the worker 181 filesystem (e.g., the local cache). For example, where the local cache is a memory-mapped file, the manager 188 may return a bit-range within the file that corresponds to the object. Thereafter, at (7), the file system process 184 accesses the requested data from the indicated location, such as by reading from the indicated bit range. In one embodiment, the file system process 184 is configured to read only a subset of the object corresponding to the data requested to be read. For example, assume that each object is a 512 kilobytes in size, and that the objects in combination represent a disk image storing data in operating-system-level data blocks each of 4096 bytes (4 kilobytes). Each object might therefore contain 128 data blocks. Assuming that the instance 183 requested to read less than all data blocks of an object, the file system process 184 may identify the particular blocks within the object that have been requested, and access only those blocks from the worker filesystem. For example, the worker 181 may identify a particular bit range within the object represented the requested blocks, and read that bit range from the worker filesystem (which particular bit range falls within the broader bit range of the object as stored within the filesystem). Illustratively, if the particular bit range is the first 256 kb of an object, the worker 181 may read the first 256 kb of the bit range for the object as stored in the worker filesystem.

In some embodiments, objects may be stored in an encrypted manner, to preserve data confidentiality. To further this goal, the information required to decrypt each object may be stored in a manifest for a data set, and access to the manifest may be limited to the file system processes 184 that facilitate access to the data set. Accordingly, the local object manager 188 (among other components) may be restricted from reading the data of an object, and the data read by the file system process 184 at (7) may be in an encrypted form. At (8), the file system process 184 thus decrypts the data. In one embodiment, an encryption key for the object is stored within a manifest for the data set. Additional examples regarding storage of the encryption key in a manifest are provided in the '369 Application, incorporated by reference above. Thus, the file system process 184 may retrieve the key for the object from the manifest and decrypt the read data using the key. In one embodiment, the object is encrypted using a block cipher, which can facilitate selective decryption of data from the object as opposed to requiring decryption of the entire object. For example, the file system process 184 may identify particular blocks encrypted using a block cipher, and decrypt those blocks using the encryption key. In the instance that objects are not encrypted, interaction (8) may be omitted.

At (9), the file system process 184 returns the requested data to the VM instance 183. Notably, the VM instance 183's views of the interactions noted above are limited to requesting to read data and being provided with that data, and are thus analogous to those interactions that would occur if the entire data set were stored locally within a user space 182 of the instance 183. These interactions may therefore be implemented without modifying configuration of the VM instance 183, and as such the serverless code execution system 110 may support use of snapshots and disk images generated under existing specifications and not specifically configured for the system 110. However, due to the on-demand retrieval of read data from such snapshots or disk images, the latency associated with use of such snapshots or images at the system 110 is substantially reduced relative to complete transfer of the snapshot or disk image to the worker 181 hosting the instance 183 prior to that use. Moreover, the computing resources used at the worker 181 are reduced, and the efficiency of such use is increased, by enabling multiple instances 183 to share access to individual objects and by loading only those objects that are actually used by an instance 183.

After accessing the data, the VM instance 183 processes the data at (10). Processing of data by a VM instance 183 is outside the scope of the present disclosure, and may correspond to any operations of the instance 183, the scope of which are commensurate with the wide variety of computing processes known in the art.

On completion of processing, the instance 183 illustratively notifies the file system process 184 at (11) that data access has completed. The notification may be generated, for example, by closing a handle to a file of the FUSE filesystem—a typical operation of code after completing use of data. To facilitate garbage collection, the file system process 184 generates a corresponding notification to the local object manager 188 at (12), indicating that the instance 183 has stopped access data of the object. The local object manager 188 thereafter at (13) decrements a reference counter for the object. Assuming that the reference counter has reached zero (indicating that no VM instance 183 is currently reading from the object), the local object manager 188 can then optionally conduct garbage collection with respect to the local cache, such as by deleting the object. Note that garbage collection is an optional process, and the local object manager 188 may in some or many cases maintain objects with zero reference counters. For example, the manager 188 may maintain frequently accessed objects even if such objects are not currently being accessed. The manager 188 may implement a variety of known cache eviction techniques to determine which objects to delete during garbage collection, including but not limited to a "least recently used" (or "LRU") or "least frequently used" eviction policy.

As discussed above, the local object manager 188 is illustratively configured to facilitate retrieval of a data object when access to that object is requested by a file system process 184 associated with a VM instance 183. Illustrative interactions for facilitating such retrieval are shown in FIG. 5.

Figure 5:
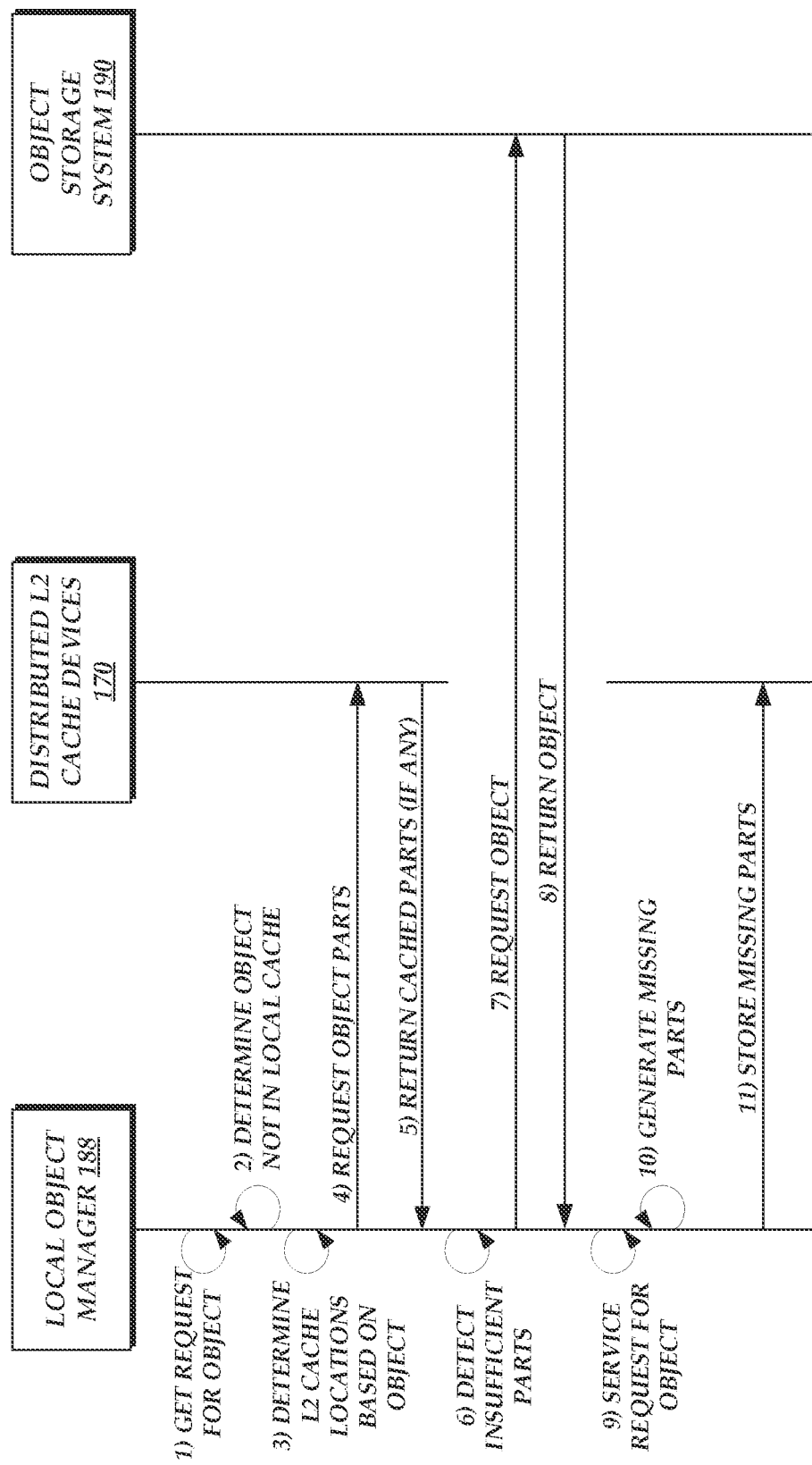
FIG. 5 is a flow diagram depicting illustrative interactions for loading a portion of a data set into storage of worker of FIG. 1 in response to a request to read the portion.

The interactions of FIG. 5 begin at (1), where the local object manager 188 gets a request for an object. The request may be made by a file system process 184 associated with a VM instance 183, as discussed above with respect to FIG. 4. As noted above, the request may include an identifier of the object, as well as an object root 194 on the object storage system 190 that represents an "origin" for the object (e.g., a location from which to retrieve the object if a cached version of the object is not located).

At (2), the local object manager 188 inspects its local cache to determine whether the requested object exists within the cache. For example, the local object manager 188 may maintain a list of currently-cached objects, and may thus inspect the list to determine whether the requested object is cached. If so, the local object manager 188 can service the request for the object from the local cache, and no further interactions are required.

For the purposes of illustration, it is assumed in FIG. 5 that the requested object is not locally cached. As such, the local object manager 188, at (3), determines a set of locations within a level two ("L2") cache storing parts of the object. As noted above, the system 110 may include a L2 cache implemented by a set of distributed L2 cache devices 170. Moreover, rather than directly storing objects within individual devices 170, each object in the L2 cache may be divided into multiple parts using erasure coding techniques, with the number of parts determined according to the particular erasure coding technique applied. Each part of an object may be stored on a different L2 cache device, with the device storing a particular part being determined according to one of a variety of load balancing techniques. In one embodiment, the L2 cache devices 170 are arranged within a consistent hash ring, and individual parts are distributed among the devices 170 according to a hashing algorithm. For example, a hash value of an object may be used to select an initial device 170, and then parts making up the object may be stored on the initial device 170 and the subsequent n−1 devices of the ring. As another example, the hash value of each part may be calculated and used to select a device 170 in the ring with responsibility for storing the part. Each local object manager 188 may store information enabling determination of the devices 170 hosting a given part, such as by implementing the same algorithm at each manager 188. Thus, storage of a part by a first manager 188 at a given device 170 would be expected to enable retrieval of that part by a second manager 188 from the L2 devices 170.

After determining L2 cache locations, the local object manager 188, at (4), requests object parts from the determined L2 cache locations. The distributed L2 cache devices 170, in turn, return the requested object parts if stored in the L2 cache locations. Should the object not be stored, an L2 cache device 170 may return an "object not found" indicator. In one embodiment, the L2 cache devices 170 do not themselves implement "cache miss" handling, and do not attempt to retrieve a requested part from another location. Thus, implementation of the L2 cache device 170 is simplified relative to other caching techniques.

In the case that a threshold number of parts is retrieved from the L2 cache devices 170 (the threshold representing a minimum number of parts needed to recreate the object from erasure coded parts), the local object manager 188 can be configured to recreate the object from the parts and return the object to the requesting process. However, for the purposes of illustration, it is assumed in FIG. 5 that the manager 188 has not obtained the threshold number of parts. As such, at (6), the manager 188 detects that an insufficient number of parts has been retrieved. Not that this may indicate any number of parts below the threshold, including zero parts. Interaction (6) may illustratively be based on positive indications from one or more devices 170 that the requested parts are not cached, a lack of indication from a device 170 within a threshold period, or a combination thereof.

On detecting that insufficient parts are stored in L2 cache devices 170, the local object manager 188, at (7), requests the object from the object storage system 190. As noted above, an initial request for an object may include designation of an object root 194 of the object storage system 190 that contains the object. The root may be identified, for example, as a logical directory of the system 190 containing the object. Thus, the manager 188 illustratively requests the object from the identified root 194. The system 190, in response, returns the object at interaction (8).

On obtaining the object, the local object manager 188 services the request for the object, such as by loading the object into a local cache and returning a location of the object in that cache to a requesting device (as discussed, e.g., above with reference to FIG. 4). The initial request for the object is therefore satisfied.

To facilitate subsequent requests for the object, the local object manager 188 is further illustratively configured to store the object within the L2 cache as a set of erasure-coded parts. Thus, at (10), the local object manager 188 conducts erasure coding against the object to generate those parts that were detected to be missing from the L2 cache at interaction (6). For example, the object manager 188 may generate all parts for the object (if no parts were received). In some instances, where some but not all parts are received, the manager 188 may generate only those parts not received from L2 cache devices 170. At interaction (11), the manager 188 stores the parts in the appropriate L2 cache devices 170, which may be identified according to the location techniques noted above. Thus, subsequent requests for the object at the local object manager 188, or at other managers 188 associated with the L2 cache, may be serviced from the L2 cache without requiring retrieval from the object storage system 190.

While FIG. 5 discusses a distributed L2 cache storing erasure-coded parts of objects, other configurations of L2 cache are possible. For example, an alternative L2 cache may use devices 170 that store entire objects, rather than erasure-coded parts. However, use of erasure-coded parts may provide a number of benefits. For example, erasure coding, as recognized in the art, enables resiliency in the case of failure by enabling an object to be re-created by less than all parts of the object. Moreover, in accordance with the present disclosure, erasure coding of parts can reduce "long tail" latencies for retrieval of objects by enabling creation of the object prior to retrieving all parts of the object, even if no outright failure has occurred.

As an illustration, consider an erasure coding that generates 5 parts from an object, and can tolerate a failure of 1 part. Further assume the parts are of different types, for example with 4 parts holding the actual data of the object and 1 part representing parity values for the 4 parts. One technique for using such parts would be to request the 4 parts holding the actual data of the object. Should any 1 part not be retrieved, an additional request for the parity data (the $5^{th}$ part) could be made, and used to reconstruct the object from the 3 data-holding parts and the parity data part. This technique significantly increases latency, as the first four requests must complete (or time out), and then a fifth request (for the parity data) must be made. Thus, this technique provides resiliency but does not improve long tail latencies.

In accordance with embodiments of the present disclosure, the manager 188 may address this problem by simultaneously requesting all parts of the object, without regard to potential types. The manager 188 may further be configured to begin constructing the object as soon as a threshold number of parts are retrieved, without respect to whether outstanding requests for remaining parts exist. If it is assumed that response times of L2 cache devices 170 fall into a distribution, the latency of operation of the manager 188 can thus be reduced by effectively ignoring the latency of the last m devices 170, where m is the loss tolerance of the implemented erasure coding scheme (e.g., the specific mechanism of erasure coding being implemented, a variety of which are known in the art). In this manner, potential "long tail" scenarios (in which the distribution has a minority of requests that take excessively long times) are mitigated. Accordingly, even if some L2 devices 170 experience partial or total failures (up to the loss tolerance of the implemented erasure coding scheme), these failures would be expected not to increase the latency of operation of the manager 188 in obtaining the object. Thus, use of erasure coding as described herein can provide significant benefits relative to directly caching objects.

As discussed above, the number of objects stored on the system 110 to facilitate embodiments described herein may be large. Moreover, constant storage of these objects may not be strictly necessary to support operation of the serverless code execution system 110. For example, snapshots of VM instances 183 may facilitate rapid provisioning, but provisioning may nevertheless occur without such snapshots. Similarly, while storing a disk image as a set of portions may provide the benefits noted herein, the system 110 may additionally store the disk image as a single object on the object storage system 190, and thus it may be possible for the system 110 to recreate such portions at a later time if the portions are deleted. To balance use of computing resources to store portions against the improved performance realized by storing portions, the object storage system 190 may therefore be configured to store portions for recently used data sets while not storing portions for not-recently-used data sets.

To facilitate this operation, the object storage system 190 in one embodiment implements life cycled object roots 194, in which garbage collection occurs at a root 194 level, rather than attempting to remove individual portions or data sets. Each root 194 may exist within a particular life cycle state, and objects within the root 194 may be removed during a final life cycle state. In this way, the system 190 may avoid a need to maintain state information as to, for example, the last time at which an individual data set (or portion thereof) was used.

Figure 6:
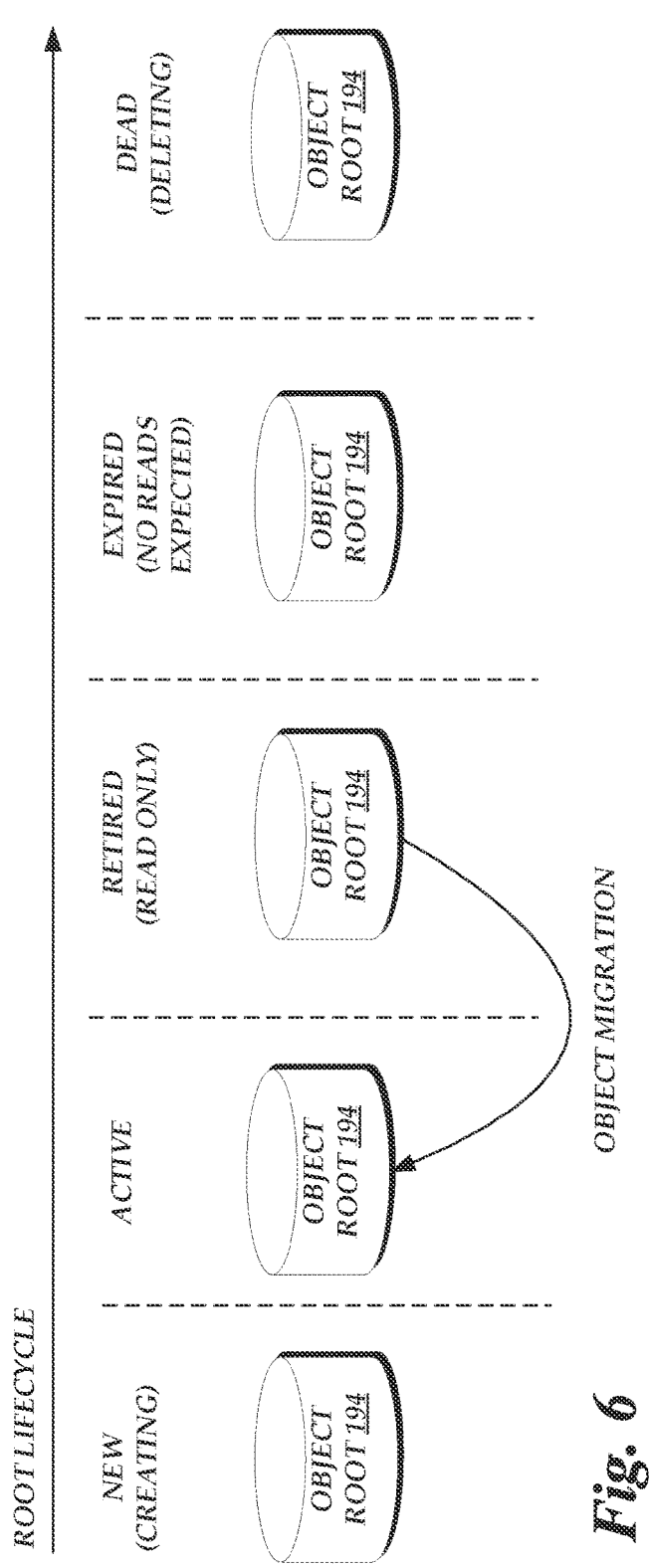
FIG. 6 is a visualization of a lifecycle for a data storage root, in which data sets may be stored to support execution of code on the serverless code execution system of FIG. 1 while also enabling garbage collection on such data sets.

An example visualization of root 194 life cycle stages is shown in FIG. 6. As shown therein, each root 194 may transition through the following stages: New (Creating); Active; Retired (read only); Expired (no reads expected); and Dead (deleting). In one embodiment, the life cycle is one directional, and roots 194 are permitted to progress only in the direction shown in FIG. 6. The illustrative life cycle stages may be described as follows:

New (Creating): This stage indicates that the system 190 is in the process of creating a root 194, such as by provisioning storage space on the system 190 to store data objects, populating the root 194 with any initial data objects, and the like. In this stage, the root 194 is not yet available for reading from or writing to.

Active: This stage indicates that the system 190 has completed creation of the root 194. New objects may be written to the root 194, such as in connection with creation of a new task on the system 110 or division of a data set for a task into portions to facilitate rapid execution of a task. Objects may be read from the root 194, such as to support execution of tasks. Roots 194 may be held in this stage for a predefined period of time selected as appropriate for garbage collection. For example, roots 194 may be held in the active stage for 1 day, 7 days, 14 days, 30 days, etc., before transitioning to a retired state.

Retired (read only): This stage indicates that the system 190 has initiated garbage collection on the root 194, and is maintaining the root 194 to determine which (if any) objects in the root 194 are in use by environments of the system 110. Because some objects may still be in use, the root 194 supports reading of objects. However, writing of new objects to the root 194 is disallowed. An indication of use of an object within a retired root 194, such as provisioning of a new execution environment with a data set including the object, illustratively results in copying of the object to an active root 194. Thereafter, subsequent environments provisioned with the data set can be supported by the copy in the active root 194. Thus, reads from a retired root 194 are progressively reduced during this stage. Roots 194 may be held in this stage for a predefined period of time as appropriate for garbage collection (e.g., 1, 7, 14, or 30 days as noted above), before transitioning to an expired state. In one embodiment, reading from a retired root 194 prevents the root 194 from transitioning to an expired state for a subsequent period. Thus, transition to an expired state is expected to occur only when no objects are being read from the retired root 194.

Expired (no reads expected): This stage indicates that the system 190 has determined that no objects within the root 194 are still in use by execution environments, and thus that the root 194 may be safely deleted. However, the system 190 may maintain the root 194 in an expired state as a failsafe, in case objects of the root 194 are still in use by other processes. For example, the system 190 may, during a retired lifecycle stage, respond to use notifications for an object by copying that object to a new active root. In some cases, such a copy operation may still be occurring when a root transitions from the retired state. Thus, the root can be held in an expired state to ensure that such copy operations completed. Use of an expired state can further provide certainty that all elements of the object storage system 190 have halted use of objects within the root, which may be difficult to confirm given the distributed nature of the object storage system 190. In some embodiments, reading of an object from a root 194 in this stage may indicate an error on the system 190, and may pause life cycle migration of the root 194 until the error is resolved. Should no reads from the expired root 194 occur, the root 194 then transitions to a dead stage after a predefined period of time as appropriate for garbage collection. In some instances, the predefined period may be set relative to entering the expired state (e.g., n hours after initially becoming expired). In other instances, the period may be set relative to a last detected operation relating to an object in the root (e.g., n hours after a last copy of an object from the root completes). In one embodiment, execution environments may be precluded from reading data from an expired root, to further prevent load on that root. As such, reads from expired roots may be limited, for example, to migration of data to an active root.

Dead (deleting): This stage indicates that the system 190 is in the process of deleting the root 194, including all objects stored within the root 194. Deletion of the root 194 thus constitutes garbage collection with respect to those objects. On completion, the root 194 is removed from the system 190.

The stages noted above are provided for illustrative purposes, and the life cycle of a root 194 may vary from these stages. For example, the "expired" stage may be omitted in some embodiments, such as those in which certainty can be achieved that the root leaves the retired state only after all operations regarding data in the root complete. In one embodiment, a single root 194 is maintained in the active stage at any time. For example, a new active root 194 may be created when transitioning of a current active root 194 to a retired stage. In other embodiments, multiple roots 194 are maintained in the active stage, and objects are divided among the roots 194 according to any of a number of load balancing techniques. For example, a first root 194 may store objects with a first range of identifiers, and a second root 194 may store objects with a second range of identifiers.

Figure 7:
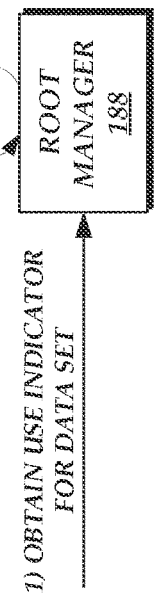
FIG. 7 is a flow diagram depicting illustrative interactions for managing root states according to the lifecycle shown in FIG. 6.

In general, objects may migrate between retired and active roots 194 in the manner shown in FIG. 6. Migration of objects is illustratively controlled by a root manager 188, with illustrative interactions for migrating objects being shown in FIG. 7. In the embodiment of FIG. 7, objects are copied between roots 194 at the level of individual data sets. As noted above, each data set may be associated with a manifest that indicates a set of objects making up the data set. In this example embodiment, the manifest for a data set is stored within a root 194 alongside the set of objects making up the data set. When a new execution environment is to be provisioned with a data set, a component of the system 110 (e.g., the placement service 160) may determine a youngest-stage root 194 containing the data set (e.g., the manifest and corresponding objects), and instruct a worker 181 to use the manifest in order to provision the environment with access to the data set. The placement service 160 may further notify the root manager 188 of use of the data set within the determined root 194. In one embodiment, the placement service 160 submits such notifications on each leasing of an environment. In another embodiment, the placement service 160 submits such notifications periodically, listing all data sets associated with leased environments and their associated roots 194. These notifications are shown in FIG. 7 as received at the root manager 188 at interaction (1).

At interaction (2), the root manager 188 then migrates in-use data sets that exist within a non-active root 194, if any. For example, the root manager 188 may iterate through the use notifications to determine a life cycle state of the root 194 associated with each notification. If the root 194 is in an active state, the root manager 188 may take no action. If the root is in an inactive state, such as retired or expired (which in some instances may be considered "sub-states" of a larger inactive state), the root manager 188 may copy the manifest and objects associated with the data set to an active root 194. Furthermore, the root manager 188 may modify the manifest such that the manifest indicates the active root 194 as a location for the objects, rather than the prior root 194. As noted above, in some embodiments objects are shared between data sets. As such, it is possible that a subset of the objects of a data set being copied already exist within the active root 194 (as part of an already-migrated data set, for example). The root manager 188 may therefore copy only objects not already present within the active root 194. Subsequent uses of the data set can thereafter be redirected to the active root 194, thus migrating reads away from non-active roots 194.

Notably, the interactions of FIG. 7 may result in redundancy in storing objects, and may also result in seemingly unnecessary copying of data between roots 194. That is, if an object is continuously used, the interactions of FIG. 7 can result in the object being continuously copied between roots 194 as those roots 194 are life cycled. The benefits of this life cycling approach may therefore not be immediately apparent. However, while this copying does result in use of computing resources to copy objects between roots 194, it also enables garbage collection to occur in a manner that overcomes significant hurdles of past techniques. For example, the approach described with respect to FIGS. 6 and 7 removes a need to track a last-used time of individual objects (or even individual data sets). Rather, the use indicators obtained at the root manager 188 may be viewed as a "to do" list of the manager 188, and these indicators may be discarded by the manager 188 after being processed in the manner described above. The amount of state information maintained by the system 190 is therefore substantially reduced. Moreover, because the garbage collection described herein is "coarse-grained" (e.g., occurring at a granularity of a root 194, as opposed to a data set or individual object), the likelihood of error due to incorrect operation is substantially reduced. In this context, "incorrect" operation does not necessarily indicate failures of an individual process, but rather the difficulty of reference counting within a distributed system. Put in other terms, because of the distributed nature of the system 190, it is difficult for any component to maintain perfect information as to the state of the system 190 with respect to an individual object or data set. Thus, fine-grained garbage collection may be particularly susceptible to incorrect operation. Moreover, the amount of data copied between roots 194 may be limited in practice due to the nature of operation of the serverless code execution system 110. For example, end users may frequently modify their tasks, such that tasks on average have a usage life span of only a few weeks or days. By setting a life span of an active root 194 commensurate with this average usage life span (e.g., as a 7 day active root 194 life span when tasks have a 5-10 day usage life span), the proportion of data copied between roots 194 can be reduced to an acceptable level, particularly given the benefits of this approach with respect to reduction in errors.

Figure 8:
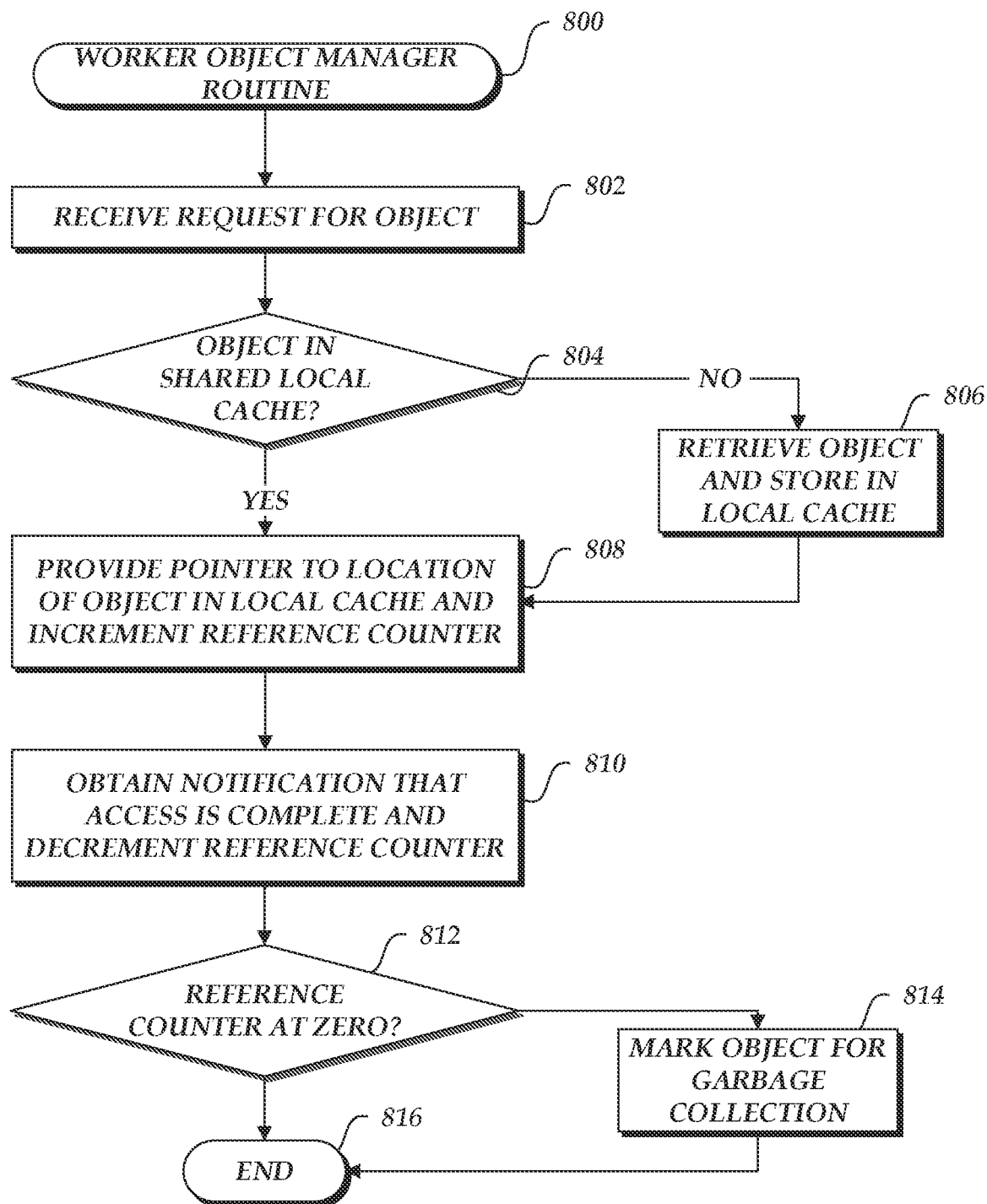
FIG. 8 is a flow chart depicting an illustrative routine for management of objects on a worker of FIG. 1, to provide rapid access to data sets enabling executions on the worker.

With reference to FIG. 8, an illustrative routine 800 will be described for management of objects on a worker 181 to facilitate rapid access to a data set relied on to support execution of a task within an execution environment of the worker 181. The routine 800 may be executed, for example, by the local object manager 188.

The routine 800 begins at block 802, where the manager 188 receives a request for an object. The request may be generated, for example, by a file system process 184 associated with a VM instance 183 hosting execution of a task, such as by the instance 183 issuing a "read" of a data block within a data set. As noted above, the file system process 184 may provide the data set as a virtualized storage device (e.g., a mounted drive), and may thus translate (e.g., using a manifest for the data set) requests to read from the storage device into a request for an object containing the requested data. The request illustratively includes a an identifier of the object, such as a hash value of the object, MAC of the object, or other unique identifier, and a location of the object, such as within a directory within a root 194 containing the object.

At block 804, the manager 188 determines whether the object exists in a shared local cache. As discussed above, the shared local cache represents memory available to the manager 188 and a reading process, such as the file system process 184. For example, the shared local cache may be a memory-mapped file on a storage device of the worker 181, which file is accessible to the process 184. The manager 188 illustratively maintains a listing of objects within the local cache to facilitate implementation of block 804. As discussed above, the local cache may be shared among all processes 184 on the worker 181, and objects may be shared among different data sets associated with different tasks. As such, the local cache may have previously been populated with the requested object, such as by implementation of the routine 800 with respect to the currently requesting file system process 184 or another process 184 associated with another task execution. In some instances, the local cache may be pre-populated with objects independent of requests from processes 184, such as by pre-populating the cache with objects shared among a large number of data sets of commonly executed tasks. Examples of such objects include, for example, objects representing data of a commonly used operating system, library, utility, etc.

In the instance that the cache contains the requested object, the routine 800 proceeds to block 808 as discussed below. In the instance that the object does not exist within the cache, the routine 800 proceeds to block 806, where the manager 188 retrieves the object and stores it in the local cache. Retrieval of the object may include, for example, retrieval of the object from the root 194 location included within the initial request. In some instances, retrieval of the object may include retrieval from a second level cache, such as via the routine 900 discussed with reference to FIG. 9, below.

After the object exists within the local cache, the manager 188 at block 808 provides to the requesting process 184 a pointer to a location, within the local cache, that includes the object. For example, where the cache is a memory mapped file, the manager 188 may return a memory pointer, within the file, that corresponds to a start of the requested object, as well as a length of the object within the file. The process 184 can therefore access the file at the location of the memory pointer, and read the file to access data of the object. As discussed above, the process 184 in some instances is configured for security purposes not to read the entire object, even though such object is accessible, but rather to read only a portion of the object requested by its respective requesting process (e.g., VM instance 183). The process 184 may additionally decrypt the read portion of the object, if such object is handled by the manager 188 in an encrypted form (again for security purposes).

In addition, at block 808 the manager 188 increments a reference counter for the object. The reference counter is illustratively used by the manager 188 to ensure that an object is not removed from the local cache while still being accessed by the process 184. Because the routine 800 may be implemented for each request of an object (with multiple instances of the routine 800 potentially implemented concurrently), and because objects may be shared among different processes 184, it is possible at block 808 that the reference counter for the object is non-zero, indicating that another process 184 also is currently accessing the file. Thus, using a reference counter (as opposed for example to a binary "referenced" or "non-referenced" status) can assist in tracking the number of processes 184 accessing an object.

At block 810, the manager 188 obtains a notification that access to the object is complete. The notification may be generated, for example, by a "close file" operation of a VM instance 183, indicating for example that the instance 183 has read the requested data and no longer requires access to that data. In another embodiment, the notification may correspond to a closing of a connection to the process 184 that requested the file, which may indicate for example a crash of the process 184 or other non-graceful shutdown. The manager 188, in response, decrements the reference counter for the object.

At block 812, the manager 188 determines whether the reference counter for the object has reached zero, indicating that no processes 184 are accessing the file. If so, the routine 800 proceeds to block 814, where the object is marked for garbage collection. The object can thereafter be deleted from the local cache, freeing up computing resources for other objects. In some instances, deletion itself occurs at block 814. In other instances, deletion occurs based on other factors, such as detection that free space in the local cache reaches a minimum threshold. While routine 800 shows this marking as a distinct step, in some cases a garbage collection process may use the reference counters of each object directly. For example, when a garbage collection process runs, such as in response to detecting a threshold minimum of free space available, the process may delete those objects with zero reference counters.

Thus, shared access to an object is provided on a worker 181 in a manner that facilitates rapid access to the data of that object while enabling efficient use of storage on the worker 181. The routine 800 then ends at block 816.

As discussed above, in some instances the system 110 may include a level two ("L2") cache implemented by a distributed set of L2 cache devices 170. The L2 cache may illustratively store objects used by workers 181 within the fleet 180, making such objects accessible to the workers 181 in a manner that is more readily accessible than objects stored in object roots 192. For example, the L2 cache devices 170 may be closer to the workers 181 in terms of network distance, have a connection to workers 181 with more available bandwidth, have additional computing resources available to service requests from workers 181, have more computing resources dedicated to servicing these requests, or the like.

To facilitate rapid retrieval, objects may be stored in the L2 cache as a set of erasure-coded parts, such that only a less than all parts of an object are required to regenerate the object from the parts. Storage of erasure coded parts may, for example, reduce the "long tail" delays that may exist when an individual L2 cache experiences partial or complete failure, and therefore fails to return data or returns such data very slowly relative to a properly functioning device 170.

Unlike some traditional caching mechanisms, objects within the L2 cache may be managed by the consumers of the objects—the workers 181 themselves—rather than by a separate device facilitating interaction with the L2 cache. Thus, individual cache devices 170 may be configured relatively simply, to obtain requests for data stored in a store of the device 170 (e.g., part store 172) and to provide such data if it exists within the store or, if not stored in the store, to return an indication that such data does not exist.

Figure 9:
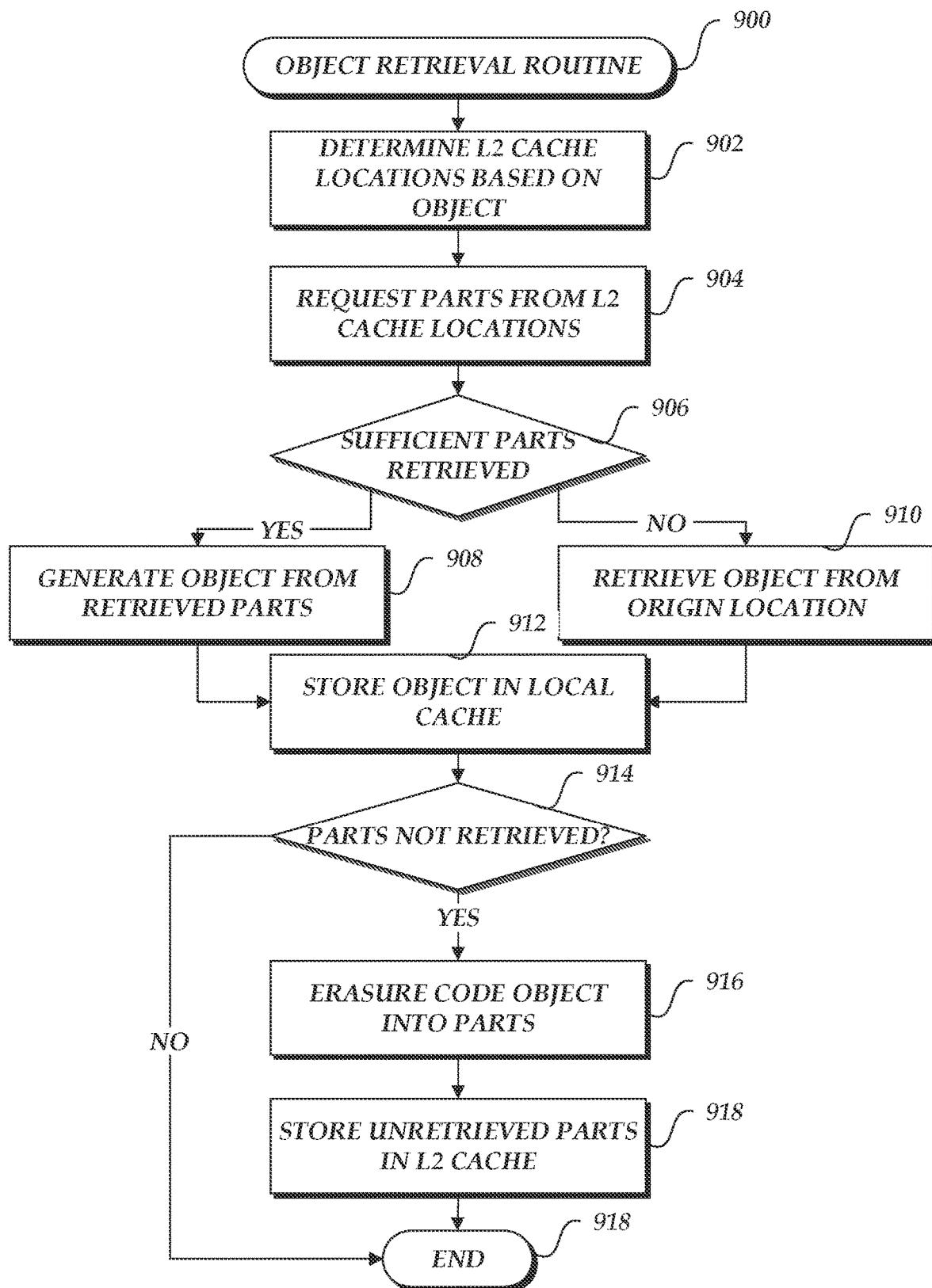
FIG. 9 is a flow chart depicting an illustrative routine for implementing a level two cache of objects used by the workers of FIG. 1, including storage of objects in the level two cache as erasure-coded parts to facilitate rapid retrieval of such objects.

To manage data in the L2 cache, each worker 181 may implement a cache management routine, an example of which is shown in FIG. 9. The routine 900 of FIG. 9 may be implemented, for example, by a local object manager 188. In one embodiment, the routine 900 may be used to retrieve objects not cached within a local cache of the object manager 188, such as to fulfill block 806 of FIG. 8. The routine 900 thus assumes that the manager 188 has identified an object to retrieve, such as an object requested by a file system process 184 in connection with the routine 800 of FIG. 8.

The routine 900 of FIG. 9 begins at block 902, where the manager 188 determines a set of L2 cache locations based on the object. As discussed above, each object may be stored in the L2 cache as a set of erasure-coded parts, with the number of such parts determined according to the particular erasure coding implemented by the manager 188. The present description will assume, for illustration only, that an object is divided into 5 parts, of which only 3 are needed to regenerate the object (a "loss tolerance" of 2 parts). Other numbers of parts and loss tolerances are possible.

In one embodiment, the set of L2 cache locations is determined according to a load balancing algorithm as applied to the object to be retrieved. For example, manager 188 may utilize a consistent hash algorithm to load balance parts among services 170. Illustratively, the L2 cache devices 170 may be logically arranged within a ring, such that each device is associated with a location on the ring. The manager 188 may illustratively determine or calculate a hash value of the object or an identifier of the object (or, where objects are identified by hash values, use that hash value directly) and identity a location on the ring for the hash value. The manager 188 may then determine a "next" device 170 on the ring, and associate that device 170 with a first part of the object, such that the object is stored (and expected to be stored) at that device 170. Subsequent parts may be stored on subsequent devices 170 within the ring, e.g., such that parts 2 through 5 are stored at the $2^{nd}$ through $5^{th}$ devices 170 on the ring, as measured (in a given direction) from the location of the object's hash value. While consistent hashing is provided as an example, any number of load balancing techniques are possible. Each manager 188 can implement the same load balancing technique, such that the locations for parts of an object are deterministic and consistent across managers 188 without requiring coordination among managers 188 (e.g., to communicate regarding storage locations of parts).

On determining locations for parts, the manager 188, at block 904, requests the parts from each cache location (e.g., each L2 device 170 expected to store a corresponding part). The request may be, for example, an HTTP "GET" request for the object, as identified by the object's identifier.

Thereafter the routine 900 varies according to the determination at block 904 if whether sufficient parts are received at the manager 188. In FIG. 9, "sufficient parts" refers to the minimum number of parts required to generate the object from erasure coded parts. For example, in the assumed erasure coding configuration, three parts would be sufficient. In one embodiment, block 904 is re-evaluated as each part is received from a device 170, such that the block 904 evaluates as true directly after sufficient parts have been received, even if outstanding requests for other parts exist and regardless of whether such outstanding requests eventually result in gathering additional parts. As such, the routine 900 need not be delayed awaiting such excess parts. This lack of delay is particularly beneficial in instances where one or more devices 170 take significantly longer to respond to the requests than other devices 170, and where those delayed devices 170 store parts not needed to generate the object. In some embodiments, evaluation at block 906 may similarly be "short circuited" when the manager 188 determines that it is not possible to retrieve sufficient parts. For example, where the loss tolerance of the used erasure coding is 2 parts and the manager 188 receives responses from 3 devices 170 that the relevant parts are not stored therein, the manager 188 may determine that block 906 has evaluated to false without delay while awaiting responses from other devices 170.

In some embodiments, the requests transmitted at block 904 occur simultaneously, with the local object manager 188 transmitting requests for all parts of the object to the identified cache devices 170. This approach can prioritize latency over bandwidth, as it might be expected to result in responses from each cache device 170 with minimal delay, and thus minimize time required to make a determination at block 906. In another embodiment, the manager 188 may transmit requests for only some parts at a first point in time, and transmit requests for a remainder of the parts at a later point in time. For example, it might be expected that a normal response time from the device 170 is a relatively short time period (e.g., ones to tens of milliseconds), while a delayed response time (such as due to congestion, device failure, etc.) is a relatively long time period (e.g., hundreds of milliseconds). The manager 188 may therefore, at a first point in time, transmit requests for only some parts of the object, such as a minimum number sufficient to generate the object. If one or more responses is not received within the expected normal response time window (e.g., 10 milliseconds, where normal responses are expected in under 10 milliseconds), the manager 188 may transmit requests for the remaining parts. By requesting less than all parts initially, bandwidth is conserved where each initial request is responded to within the initial response window. Moreover, by requesting the remaining parts after the normal response window, the total time required to make a determination at block 906 is still reduced relative to other caching techniques, such as storage of an object in a single device 170. For example, assume that one of the devices 170 storing an initially requested object does not respond in the normal response time window (e.g., under 10 ms), and that the manager 188 thus requests remaining parts after that window has passed. Assuming that a sufficient number of devices 170 respond to the requests for remaining parts within the normal time window, the manager 188 may nevertheless make a determination at block 906 in a period of around two times the normal response time window (e.g., around 20 milliseconds). Thus, so long as the expected time window for delayed responses is greater than 2 times the time window for normal responses, this approach of bifurcating requests into two time periods can provide reduced bandwidth usage while still providing for reduced latency relative to a single request for an object stored at a single device 170.

After the determination at block 906, if sufficient parts are retrieved, the routine 900 proceeds to block 908, where the manager 188 generates the object from the erasure coded parts. Specifics for generation of a data item from a set of erasure coded parts varies according to the particular erasure coding technique used, a variety of which are known in the art. Thus, details of such generation are not described in detail herein.

If sufficient parts are not retrieved, the routine 900 proceeds to block 910, where the manager 188 retrieves the object from an origin location. For example, the manager 188 may retrieve the object from a root 194 storing the object. In one embodiment, the request for the object identifies the origin location. In another embodiment, the manager 188 identifies the origin location, such as via interaction with root manager 188 to determine a root 194 in which the object is stored.

At block 912, after generating or retrieving the object, the manager 188 stores the object in the local cache. The object can thus be made available to a requesting device, such as via the routine 800 of FIG. 8.

While block 912 can satisfy requirements that an object is retrieved (e.g., such that other processes awaiting the object, like the routine 800 of FIG. 8 need not be delayed), the routine 900 includes a number of further blocks related to management of the L2 cache. These additional blocks may illustratively be implemented in an asynchronous manner relative to requests for objects handled by the manager 188. For example, the additional blocks may be delayed by the manager 188 until sufficient resources are available at the manager 188 to implement the blocks.

These additional blocks begin at block 914, where the manager determines whether any requested parts (e.g., as requested at block 904) were not received. Notably, block 914 may evaluate as true even when sufficient blocks were received to regenerate the requested object (e.g., block 906 evaluated as true). This is because the L2 cache can benefit from store all parts of an object, not just a minimum number of parts, both for resiliency purposes and for purposes of speeding later retrieval. For example, it is possible that a non-retrieved part is stored at an L2 device 170 that operates more quickly than the L2 devices 170 that provided retrieved parts, thus speeding later implementations of block 906. Block 914 may take into account, for example, parts that were received after block 906 evaluated as true. For example, block 914 may evaluate as false if all parts were retrieved, even if block 906 evaluated as true based on retrieval of less than all parts.

If all parts were retrieved, there may be no need for the manager 188 to re-generate and store parts, and the routine 900 ends at block 918. However, if some parts were not retrieved, the routine 900 proceeds to block 916, where the manager 188 erasure codes the object into at least the unretrieved parts. Specifics for erasure coding a data item into a set of erasure coded parts varies according to the particular erasure coding technique used, a variety of which are known in the art. Thus, details of such erasure coding are not described in detail herein. Thereafter, at block 918, the manager 188 stores the unretrieved parts in their respective locations of the L2 cache (e.g., the devices 170 identified at block 902, from which the parts were not retrieved). Notably, blocks 916 and 918 may account for both situations in which one or more parts of the object were lost among the L2 cache (e.g., due to failure of a device 170) and in which the L2 cache simply lacked a given object (e.g., due to the object not being recently requested). Thus, the previously unretrieved parts are stored within the L2 cache and made available for subsequent implementations of the routine 900. The routine 900 then ends at block 918.

Figure 10:
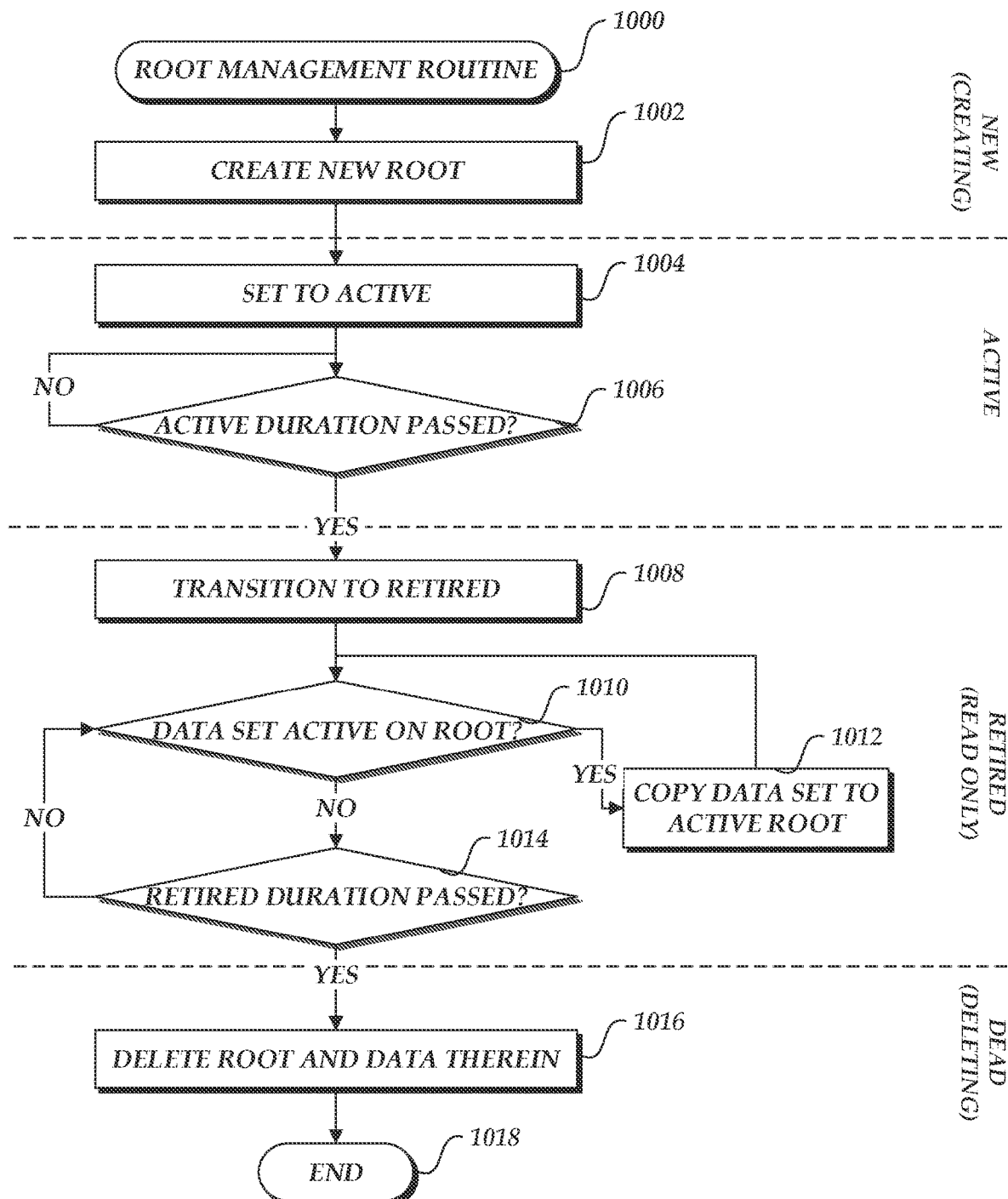
FIG. 10 is a flow chart depicting an illustrative routine managing lifecycles of roots to enable garbage collection of data sets stored within those roots.

With reference to FIG. 10, an illustrative routine 1000 will be described for conducting garbage collection on an object storage system using a life-cycled root. The routine 1000 may be implemented, for example, by a root manager 192 of the object storage system 190 in order to remove unused data from the system 190 and thus reclaim computing resources.

The routine 1000 begins at block 1002, where the root manager 192 creates a new root on the system 190. The root illustratively represents a logical storage location on the system 190, such as a prefix within a hierarchy of storage locations. Creation of the root may include creation of the storage location, and in some instances may further include placement of pre-defined data within the storage location, such as commonly used objects (e.g., commonly referred to portions of data sets).

After creation of a root, the routine 1000 proceeds to block 1004, where the manager 192 sets the root's state to "active." An active state indicates that the root is available for writing to by other components. For example, a frontend 120 may place a data set in the root, such as by dividing the data set into a number of portions and storing the portions as individual objects within the root, along with a manifest identifying the portions. As discussed above, an active root may also be available for reading from on the system 190. During the active stage, the manager 192 may illustratively respond to inquiries regarding active roots by providing an identifier of the active root.

The routine 1000 then proceeds to block 1006, where the manager 192 determines whether an active duration of the root has passed. The active duration may be set by an administrator of the system 190, such as based on a statistical measure for duration of use of data sets on the system 190. For example, the active duration may be established on the order of hours, days, weeks, etc. In one embodiment, the active duration is between 7 and 14 days. If the active duration has not yet passed, the routine 1000 continues to loop until the duration is reached.

Once the active duration has passed, the routine 1000 proceeds to block 1008, where the manager 192 transitions the root to a retired state. During the retired stage, the manager 192 is illustratively configured to stop identifying the root in response to inquiries for active roots, thus halting writing of new data to the root. However, the root may still be available for reading on the system 190.

In addition, during the retired state, the manager 192 may obtain notifications that a data set within the retired root is in fact actively used, as shown at block 1010. Such notifications may include, for example, provisioning a new execution environment with access to the data set, a device reading from the data set, or the like. If a notification is received at block 1010, the routine 1000 proceeds to block 1012, where the manager 192 copies the data set to an active root. In one embodiment, the manager 192 is configured to create a new active root prior to transitioning a currently-active root to a retired state. For example, the routine 1000 may be modified to include, prior to block 1008, a block that initiates an additional implementation of the routine 1000. Copying of the data set may include duplicating the data set in the location corresponding to the new root. In some embodiments, copying of the data set may include deleting the data set from the current root. However, in other embodiments, the data set is maintained in the current root to continue supporting reads of the data set from the current route. As noted above, in some instances data sets may be stored as a set of objects and a corresponding manifest, with at least some objects potentially being shared by other data sets. In these instances, copying of the data set may include referencing the manifest to identify the set of objects to be copied to the new root, and copying those objects within the set that do not already exist within the new root. After copying, the routine 1000 returns to block 1010.

After each active data set is copied to a new active root, the routine 1000 proceeds to block 1014, where the manager 192 determines whether a retired duration for the root has passed. If not, the routine returns to block 1010 until that duration has passed. The retired duration can generally be set according to similar considerations as the active duration. However, the retired duration may differ from the active duration (e.g., longer or shorter than the active duration). In some instances, a single retired duration is used, as measured from the last time at which a data set was indicated as active in the retired root. In other instances, multiple retired durations are used. For example, a first retired duration may be established from implementation of block 1008 (the transition to retired), and a second retired duration may be established from the last time at which a data set was indicated as active in the retired root. In one embodiment, the manager 192 requires all retired durations to have passed before block 1014 evaluates as true.

Thereafter, the manager 192 determines that no data is in active use on the root. Thus, at block 1016, the manager 192 deletes the root and the objects contained therein. Thus, garbage collection on the system 190 is accomplished and storage resources used to store data are reclaimed. The routine 1000 then ends at block 1018.

The routine 1000 is intended for illustration, and variations are possible and contemplated herein. For example, rather than deleting the root at block 1016, the manager 192 may instead mark the root as "garbage," such that another element of the system 190 may later delete the root (e.g., as storage space is required). As another example, while the routine 1000 depicts a 4 stage lifecycle (new, active, retired, and dead), the routine 1000 may be modified to support additional stages, such as an "expired" stage. As discussed above, the expired stage may be used as a failsafe state, to prevent deletion of data still in use. In one embodiment, implementation of an expired state may include insertion of a new block between blocks 1014 and 1016, which inserts a delay in the root lifecycle corresponding to the expired state, with the delay timed to enable any pending operations on data of the root (e.g., copying of a data set to an active root) to complete. In another embodiment, this newly inserted block may be a decision block, that precludes transition to a dead state so long as any process (e.g., a copy process) is utilizing data of the root. In yet another embodiment, implementation of an expired state may be similar to that of the retired state, except that a notification of an active data set within an expired root may be reported as an error. Thus, to implement an expired stage, the routine 1000 may be modified to include another copy of blocks 1008-1014 in between blocks 1014 and 1016 as shown in FIG. 10, and to modify the second copy of these blocks such that, in the second copy, implementation of block 1012 raises an error message to an administrator of the system 190. In still other embodiments, another copy of blocks 1008-1014 in between blocks 1014 and 1016 as shown in FIG. 10, and block 1012 may be modified to raise an error but not to cause copying of the data to an active root. Other modifications to FIG. 10 are possible.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A worker computing device facilitating execution of a serverless function, the worker computing device comprising:
    one or more processors configured to execute serverless functions, wherein the one or more processors implement, for each serverless function:
        a virtual machine instance configured to execute the serverless function; and
        a Filesystem in Userspace (FUSE) handler process that provides to the virtual machine instance access to a data set associated with the serverless function;
        wherein the data set is represented by a collection of data objects, and wherein the FUSE process is configured to:
            obtain a request from the virtual machine instance to read a portion of the data set;
            access a corresponding data object, within the collection of data objects, that contains the portion; and
            return the portion of the data set to the virtual machine instance;
    a cache configured to store data objects requested by the serverless functions and to provide shared access, among the FUSE handler processes for each serverless function, to the data objects stored in the cache;
    wherein the one or more processors are further configured to execute a cache manager that handles requests, from the FUSE handler processes, to read data objects at least partly by, for an individual request from an individual FUSE handler process to read an individual data object:
        if the individual data object does not exist within the cache, retrieving the individual data object and storing the individual data object within the cache; and
        providing to the individual FUSE handler process a location of the individual data object within the cache, wherein the location enables the individual FUSE handler process to access the individual data object within the cache.

2. The worker computing device of claim 1, wherein the Filesystem in Userspace (FUSE) handler process for each virtual machine instance provides to the virtual machine instance local access to the corresponding data set without requiring that the corresponding data set be loaded local storage of the worker computing device.

3. The worker computing device of claim 1, wherein each data set is at least one of a disk image representing a virtualized storage drive of the corresponding virtual machine instance or a virtual machine snapshot enabling the corresponding virtual machine instance to be restored to a state captured within the virtual machine snapshot.

4. The worker computing device of claim 1, wherein the cache is a memory mapped file on a filesystem of the worker computing device.

5. A method implemented by a host computing device comprising:
    hosting a plurality of execution environments, each execution environment corresponding to a serverless function;
    providing, for each execution environment, a process that provides to the execution environment access to a data set associated with the serverless function corresponding to the execution environment, wherein the data set is represented by a collection of objects, and wherein the process is configured to:
        obtain a request from the execution environment to read a portion of the data set;
        access a corresponding data object, within the collection of data objects, that contains the portion; and
        return the portion of the data set to the execution environment;
    initiating a cache on the host computing device that provides shared access, among the processes provided for each execution environment, to data objects within the cache;
    responding to a first request for an individual data object from a first process associated with a first execution environment at least partly by:
        detecting that the individual data object does not exist within the cache;
        retrieving the data object and storing the data object in the cache; and
        providing to the first process a location of the individual data object within the cache, wherein the location enables the first process to access the individual data object;
    responding to a second request for the individual data object from a second process associated with a second execution environment at least partly by:
        detecting that the individual data object does exist within the cache; and
        providing to the second process the location of the individual data object within the cache, wherein the location enables the second process to access the individual data object.

6. The method of claim 5, wherein each collection of data objects represents a corresponding data set in encrypted form, and wherein each process is configured to decrypt data objects within the collection of data objects.

7. The method of claim 6 further comprising providing to each process a manifest that identifies, for the data set corresponding to the process, the collection of data objects that represent the data set, wherein the manifest includes an encryption key by which each data object within the collection of data objects is encrypted.

8. The method of claim 5, wherein the process provided for each execution environment executes within a distinct user space isolated from user spaces of other processes for other execution environments.

9. The method of claim 5 further comprising:
    for each request for the individual data object, incrementing a reference counter for the individual data object that identifies a number of processes accessing the individual data object within the cache;
    obtain one or more indications that access of the individual data object within the cache is complete; and
    for each indication of the one or more indications, decrement the reference counter for the individual data object.

10. The method of claim 9 further comprising:
    detecting that the reference counter for the individual data object is at zero; and
    deleting the data object from the cache.

11. The method of claim 10, wherein deleting the data object from the cache is responsive to a level of free space in the cache reaching a threshold level.

12. The method of claim 5, wherein each process is a Filesystem in Userspace (FUSE) handler process that presents the corresponding data set to the corresponding execution environment as a file system.

13. The method of claim 12, wherein each FUSE handler process provides the corresponding execution environment with access to the corresponding data set as a mount point on a file system of the host computing device.

14. The method of claim 5, wherein providing to the first process the location of the individual data object within the cache comprises providing to the first process a pointer to the location within a memory mapped file.

15. Non-transitory computer-readable media including:
first computer-executable instructions that, when executed by a host device, cause the host device to:
establish one or more execution environments, each supporting execution of a serverless function; and
for each execution environment, initiate a process configured to:
obtain a request from the execution environment to read a portion of a data set associated with the serverless function supported by the execution environment;
access a corresponding data object, within a collection of data objects that represents the data set, that contains the portion; and
return the portion of the data set to the execution environment;
second computer-executable instructions that, when executed by the host device, cause the host device to:
initiate a cache on the host device that provides shared access, among the processes provided for each execution environment, to data objects within the cache;
respond to requests for data objects received from processes at least partly by, for an individual request for an individual data object received from an individual process:
if the individual data object does not exist within the cache, retrieving the data object and storing the data object in the cache; and
providing to the individual process a location of the individual data object within the cache, wherein the location enables the individual process to access the individual data object.

16. The non-transitory computer-readable media of claim 15, wherein each request for a data object identifies a network location from which the data object can be retrieved for storage in the cache.

17. The non-transitory computer-readable media of claim 15, wherein the one or more execution environments include two execution environments respectively associated with two different data sets, and wherein at least one data object is included in both collections of data objects that represent the respective data sets of the two different data sets.

18. The non-transitory computer-readable media of claim 15, wherein data objects within the cache are identified according to hash values of the data object.

19. The non-transitory computer-readable media of claim 15, wherein first computer-executable instructions cause the processes for each execution environment to be executed within respective user space for each execution environment, and wherein the second computer-executable instructions cause the cache to be initiated in a filesystem location accessible to each respective user space.

20. The non-transitory computer-readable media of claim 15, wherein data objects within the cache are stored in encrypted form, and wherein decryption keys for the data objects are stored within users spaces of execution environments that are permitted to access the data objects.

* * * * *